United States Patent [19]
Yau

[11] Patent Number: 5,971,763
[45] Date of Patent: Oct. 26, 1999

[54] METHOD OF TEACHING, TRAINING AND PRACTICE COSMETOLOGY TECHNIQUES AND A MAKE-UP MANNEQUIN KIT FOR USE THEREWITH

[76] Inventor: Peter Yau, 358 Tarrington Way, Bolingbrook, Ill. 60440

[21] Appl. No.: 09/109,227

[22] Filed: Jun. 30, 1998

[51] Int. Cl.$^6$ .................................................. G09B 19/00
[52] U.S. Cl. .......................... 434/100; 434/99; 434/219; 434/256; 434/377; 446/100; 446/321; 446/391; 132/319
[58] Field of Search ............................. 434/86, 99, 100, 434/219, 256, 270, 377; 446/100, 321, 391; 132/285, 319

[56] References Cited

U.S. PATENT DOCUMENTS

| | | | |
|---|---|---|---|
| 2,543,458 | 2/1951 | Hess | 132/319 |
| 2,628,626 | 2/1953 | Teillaud | 132/216 |
| 2,917,058 | 12/1959 | Ferrar | 132/216 |
| 2,968,104 | 1/1961 | Ito | 434/94 |
| 3,419,993 | 1/1969 | Rodgers | 446/100 |
| 3,464,146 | 9/1969 | McCurdy | 446/100 |
| 4,886,079 | 12/1989 | Mooney | 132/319 |
| 4,957,124 | 9/1990 | Mooney | 132/200 |
| 5,046,986 | 9/1991 | Wood | 446/321 |
| 5,090,910 | 2/1992 | Narlo | 434/82 |
| 5,320,535 | 6/1994 | Min | 434/100 |
| 5,480,337 | 1/1996 | Baker | 446/100 |
| 5,676,584 | 10/1997 | Perryman | 446/321 |
| 5,860,433 | 3/1996 | Halpern | 132/319 |

*Primary Examiner*—Robert A. Hafer
*Assistant Examiner*—Kurt Fernstrom
*Attorney, Agent, or Firm*—Sidney N. Fox

[57] ABSTRACT

A cosmetology training, teaching and practice system, and a make-up mannequin kit, each charcterized by provision of a soft skin make-up mannequin head having a body carrying an oval symmetrical facial configuration and plural soft skin flexible, elastic, resilient and stretchable companion mask members suitable for mounting upon the make-up mannequin head. Each of the companion mask members having, each of which is formed of size and shape conforming to the size of the make-up mannequin head and having a facial configuration identical to the facial configuration of said make-up mannequin head. Each companion mask member having a surface of skin tone and color representative of the skin tone and color of different plural human ethnic and racial origin. The selected companion mask is stretched to mount upon the make-up mannequin head and is sufficiently resilient to spring back in tight engagement with the facial configuration of the make-up mannequin head. The mannequin kit includes,in addition to the make-up mannequin head and companion masks, all the instructions, application implements and cosmetic compositions required for the teaching, training and practice of the cosmetology art along with a stand for mounting the make-up mannequin head and a carrier for holding and transporting the contents of the kit.

24 Claims, 14 Drawing Sheets

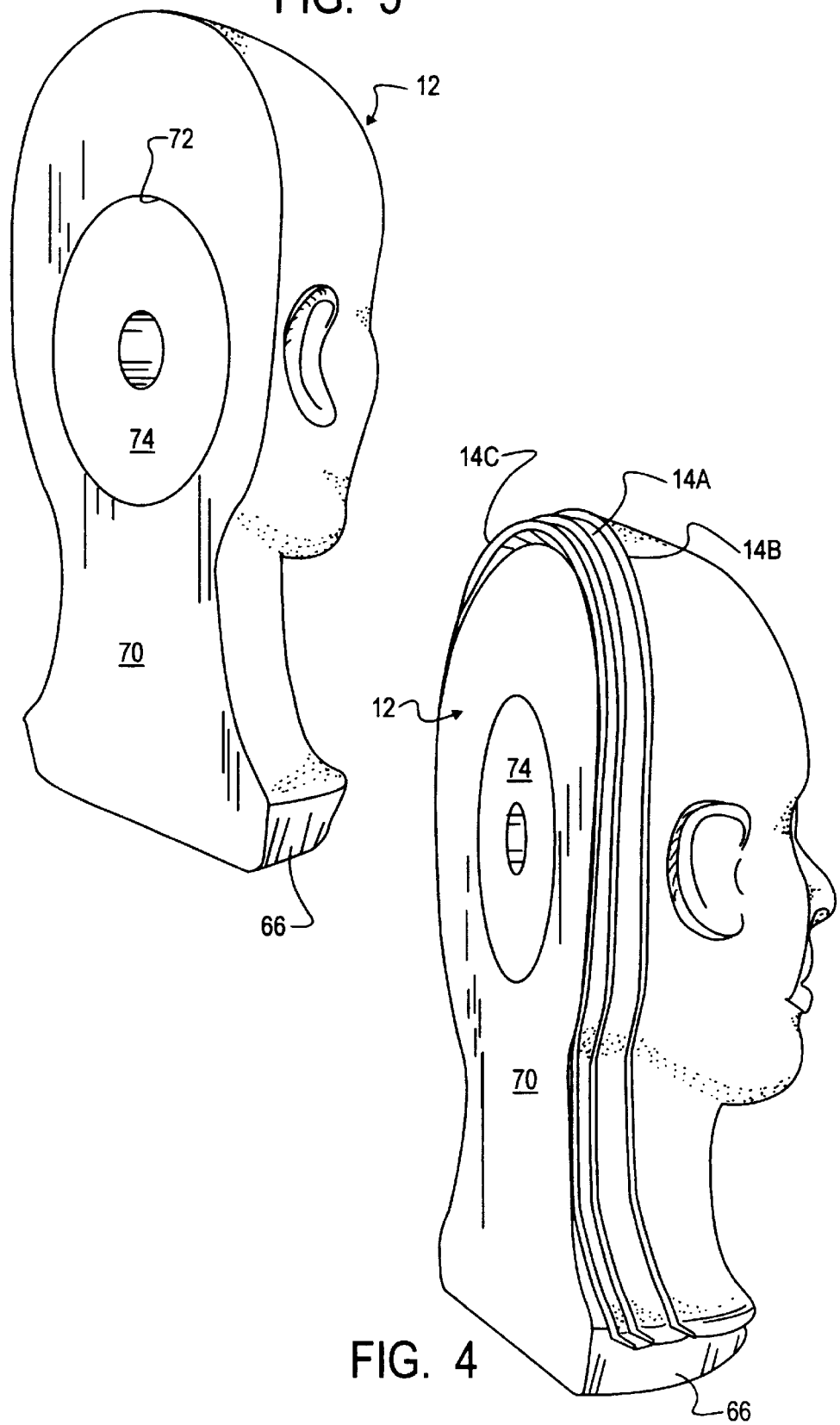

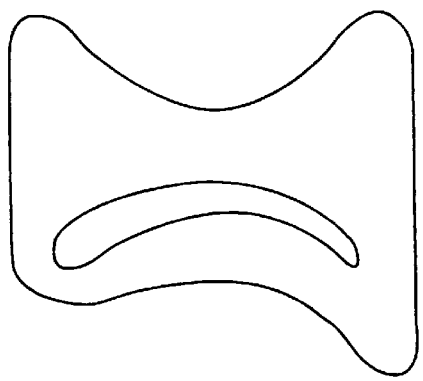
FIG. 11A
FIG. 12
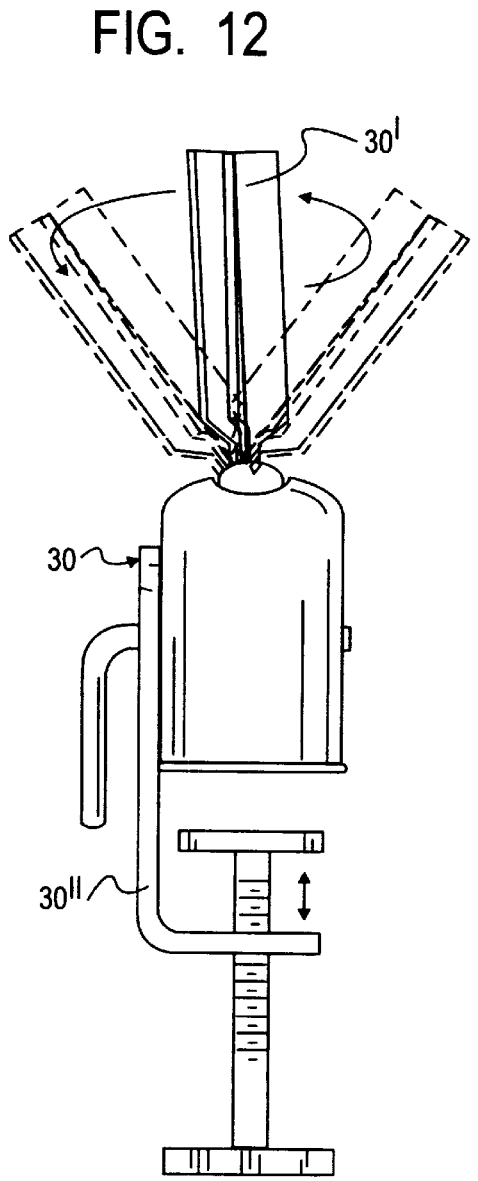
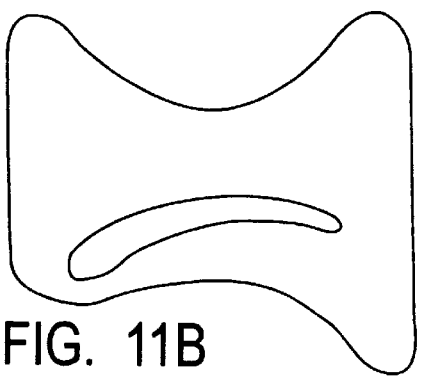
FIG. 11B
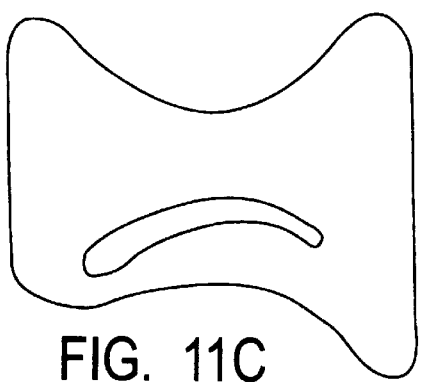
FIG. 11C
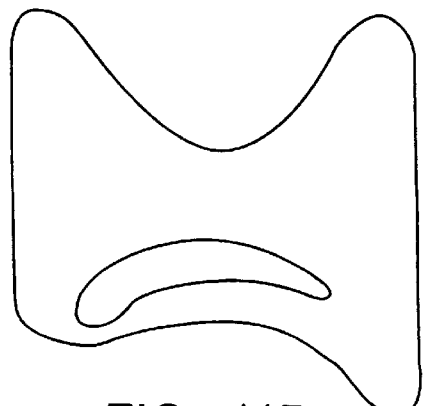
FIG. 11D

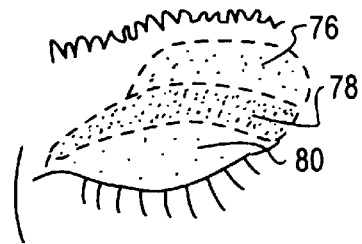
FIG. 15A  FIG. 15A'
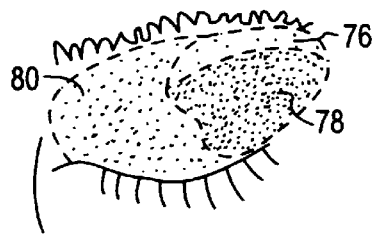
FIG. 15B  FIG. 15B'
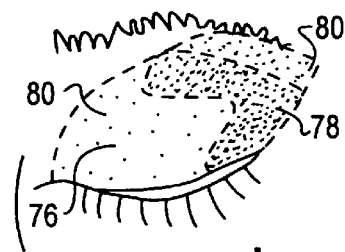
FIG. 15C  FIG. 15C'
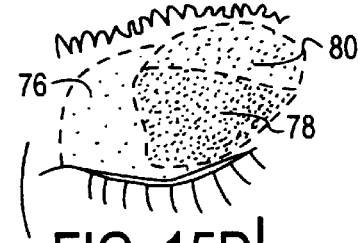
FIG. 15D  FIG. 15D'
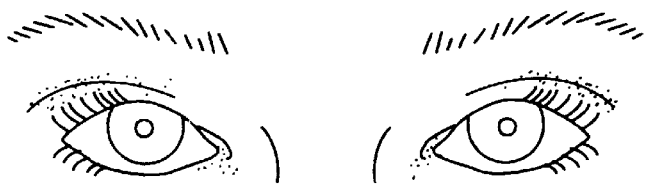
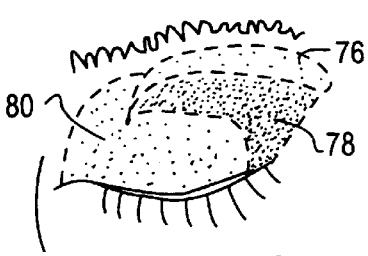
FIG. 15E  FIG. 15E'

FIG. 17A
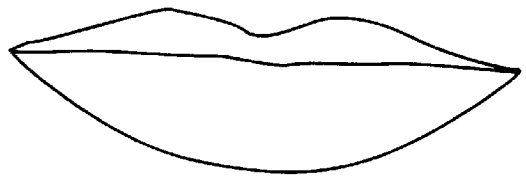
FIG. 17B
FIG. 17C
FIG. 17D
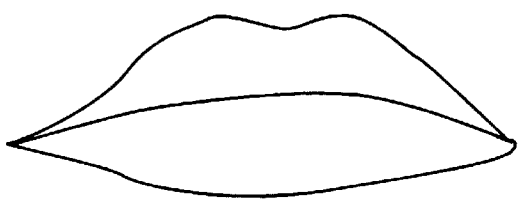
FIG. 17E
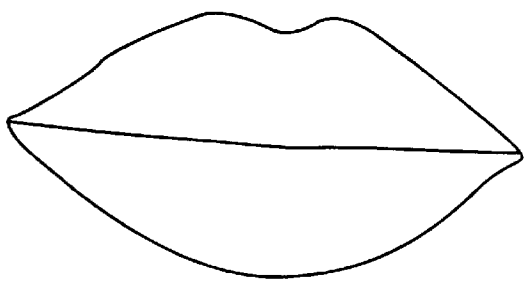
FIG. 17F
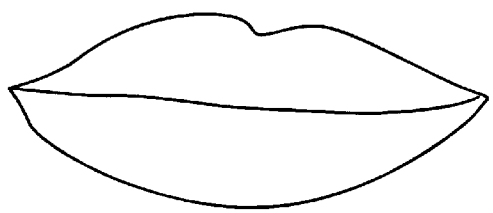
FIG. 17G
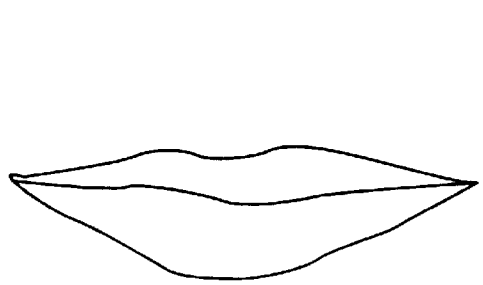
FIG. 17H
FIG. 17I

METHOD OF TEACHING, TRAINING AND PRACTICE COSMETOLOGY TECHNIQUES AND A MAKE-UP MANNEQUIN KIT FOR USE THEREWITH

FIELD OF THE INVENTION

This invention relates generally to cosmetology training and practice systems and methods and more particularly a method of teaching, training and practice cosmetology techniques and a make-up mannequin kit for use therewith, said method involving the use of a make-up mannequin kit including make-up mannequin head having a "perfect" or "ideal" facial configuration, i.e. an oval facial configuration, the facial surface of said make-up mannequin head having a smooth soft realistic texture simulative of human skin and plural flexible reusable replacable elastic companion masks having a facial configuration identical to the facial configuration of the make-up mannequin head and an outer surface which also has the smooth, soft and realistic textural quality of the aforementioned make-up mannequin kit, each companion mask being selectively removably mountable upon the make-up mannequin head. Each of the companion masks having a different skin-tone and color representative of one of each generally recognized ethnic and/or racial origin so that the trainee or student can have hands-on experience with each of persons of said ethnic and/or racial origin in the course of their cosmetology training and practice so as to learn and practice skills particularly adapted for application to the many different individuals of varied ethnic and racial origin. The make-up mannequin kit also includes the implements used by the trainee or student in the course of their cosmetology studies, training and practice, such as plural eyebrow and other stencil templates, eyebrow pencils, eyelash pencils, applicator brushes, plural cosmetic compositions, including highlighter and eye disguise, eye shadows of varying density, shading, blush, rouge, foundation and cleansing cremes and applicators therefor as well as containers carrying compositions for removing applied cosmetics from the facial surface of the make-up mannequin and companion masks as well as other miscellaneous applicator tools, implements and cosmetic compositions. The make-up mannequin kit can be employed both inside and outside of the class room, say at the trainee's home, for example, where practice can take place, since the make-up mannequin kit of the invention is portable. The make-up mannequin kit also may include stands or fixtures for mounting said make-up mannequin in operating condition on a platform or working surface.

BACKGROUND OF THE INVENTION

The cosmetic industry involves not only the marketing of its products but also has considerable interest in the teaching and practice of make-up techniques and application as a important skill to be obtained for future and present practitioners.

The marketing of cosmetic products by the cosmetic industry is effected through various channels. Traditionally, considerable attention is directed to massive advertising via television, the press, bill board advertising, publicly distributed descriptive brochures, point of sale displays and at beauty trade shows, more recently, in the presentation of point of sale demonstrations, home visits, trade show advertising and demonstrations, and other numerous marketing techniques, including technique demonstrations in motion through the electronic computer communications medium of the Internet.

Thus there is a considerable need for cosmetitians to function in the application of cosmetics to individuals in the entertainment industry, including the television, motion picture and theatrical enterprises as well as the fashion industry. Another significant area of cosmetic use requiring unusually skilled practitioners involves the application of make-up on actresses, actors, fashion models both male and female and those individuals encompassing different racial characteristics, particularly differences in skin tone, in facial shape and features, the moods and appearance capable of being can be changed and/or adjusted to fit particular different situations by the selective application of make-up. The various characteristics which are required for producing various and different effects varying significantly both in individuals and in relation to the visual effects to be desired.

In respect of the point of sale demonstrations, home visits, trade show attendance and advertising, the home-party sales demonstrations employed for the sale of cosmetic products, individuals are employed to conduct such demonstrations and sales efforts. These individuals must be trained in the techniques involved in the application of cosmetics. Training in such techniques has been performed by the various commercial organizations within the industry and often involve the use of living models both for the training sessions as well as the empirical practice sessions that are required to assure proper preparation necessary to enable successful demonstration of the cosmetic products. The experience of such trainees must include must include the application of cosmetic application technique and experience with at least plural individuals of different ethnic and/or racial origins with differing skin-tone and color. Therefore, where living models are employed, many are required to fulfill the varied ethnic and racial originated persons likely to be met in the course of performing the demonstrations of cosmetic products to the public. Each ethnic and/or racial group requires techniques specific to that ethnic and/or racial group members facial structure, configuration and skin character. Accordingly, a considerable number of individual living models encompassing all the frequently encountered persons would be required for each member producer of the industry engaged in such type of marketing practices conventionally utilized.

Not only are there few available living models meeting each of the conventionally encountered ethnic and/or racial groups sufficient to meet the need of the industry, the costs to each member of the industry engaged in such marketing efforts would be prohibitive. In addition, particularly for those individuals engaging in the tradeshow demonstration activities, the home visits and the home-party types of marketing, the art has been required to provide portable substitutions for the living model, substitutions such as make-up mannequins which can be portable, capable of being carried to the locations at which the demonstrations are to be carried out in situ, packed up and taken by the demonstrator to the site of another subsequent demonstration.

Now, the art has made available make-up mannequin heads for use in demonstrating the application of cosmetics. However, the available make-up mannequin heads where provided, are specific in color and/of skin-tone representing only one of the plural ethnic or racial individuals. Accordingly, the demonstrator must carry plural ethnically and/or racially specific make-up mannequin heads for each demonstration. This is difficult, unwieldly and represents an undue burden for the demonstrator.

Not only are there difficulties raised for the home sales demonstrator by the presently available make-up mannequin heads, but equally, difficulties are experienced by the industry in providing adequate training and experience as well as practice additionally required by trainees following the instructional and training sessions by the lack of adequate supply of living models and/or make-up mannequin heads for each of the aforementioned trainees, due to cost and/or unavailability. Yet it is nevertheless important that there be sufficient training, experience and practice in the application and technique of transferring cosmetic and make-up skills learned by the trainee to be applied to individuals having various different skin-tone and color as well as applied to individuals having the different color-tone, color and individuals having ones of the different and varied classic facial shapes as will be described hereinafter.

Another significant factor to be considered in the training of cosmeticians is the substantial number of individuals desiring entry into the cosmetology service and retail field involving beauty culture. Schools specializing in the teaching and training of cosmeticians for the retail trade comprise a large portion of the cosmetic industry. Many accredited cosmetology or trade schools are governed by governmental, usually state, professional regulations prohibiting student practice on living persons or models during training unless they are finishing all the instructional courses and reaching the completion of the course of study. Then practical training which is paramount if a part of the following graduation process, i.e. graduate study and internship. Therefore, a make-up mannequin should be provided which is closest to being humam-like, and would provide a tool for training and practical practice for gaining knowledge and experience on various ethnic and/or racial color and skin-tone persons.

Conventionally, two-dimensional drawings, photographs as well as written descriptions have supplied the principal guidelines for the both the industrial demonstrator and the other student trainees in learning specific make-up techniques on individuals having various skin- tone, color and ones of the classic facial shapes, including variations thereof. Instruction is only one of the prime factors in the teaching of such make-up techniques. Practice and a lot of repeated practice is the other of said prime factors, and is essential, whether the trainee is a novice, a beautician, a cosmologist, a company demonstrator or simply a person having strong interest in receiving professional training in the field. Those persons who commercially demonstrate cosmetic application on actual human subjects often reach a certain level of make-up training experience from their respective commercial enterprises or as a result of personal experience or by way of their company's training procedures but truly benefit from experiencing professional courses of study from experts in the field via attendance at teaching institutions specializing in the field.

At the beginning stages of instruction, the training tools involve the aforementioned 2-dimensional pre-drawn diagrams of a human female head, various cosmetics and various pencils and brushes employed in the application of such cosmetics. At the intermediate and later stages of the training, living human models are employed to provide realistic practical cosmetic applications. Generally, it has been found that it is difficult to demonstrate the differences in applying cosmetic make-up to living models of different ethnic and/or racial origin unless there are among the living human models, models of the different ethnic and/or racial origin.

Unless the subject model has the skin-tone and/or color of the particular ethnic and/or racial origin, one cannot realisticaly demonstrate the correct application of cosmetic thereto or thereon for teaching the application of cosmetics to those who differ in color and/or skin-tone. Persons having darker skin-tone use different color of foundation, eye, eyelash, eyebrow, touch-up, shading, shadow and like cosmetic compositions that lighter skin-toned persons or persons of oriental, asiatic or other ethnic and/or racial origin. Thus, trainees would have limited realistic tools for receiving instruction and for practice in a great many of the instructional institutions presently available for gaining instruction in cosmetic make-up application on various different skin-tone persons, not only involving the skin-tone factor but also on a human facial configuration with realistic features.

While ordinary mannequin heads of the type employed to teach hair-styling or fashion mannequins have been utilized in the training of cosmetic artists, beginning and somewhat experienced students, as well as commercial demonstrators, difficulties nevertheless arise due to the surface textures of these conventionally available mannequin heads as well as the necessity to make available to each trainee, individual mannequins and mannequin heads having each of the different skin-tones as well as mannequins having realistic textured surfaces reflecting the differences between actual human subjects of different ethnic and/or racial origins.

The conventional mannequin heads are provided with a smooth but relatively hard facial surface, white or normally Caucasian in color and brown or normally african origin in color. Some more recently available mannequin heads produced especially for use as make-up mannequin heads have been formed from soft plastic material such as urthane, polyvinyl chloride and similar plastics which are characteristically porous. The porosity is fine, ordinarily invisible to the naked eye and is such as to require a foundation or cleanser creme to be applied to the selected area thereon where make-up is to be applied so as to cover the invisible porosity of the application area, sealing the application area inorder to prevent the penetration of the make-up cosmetic and the resulting entrapment thereof within the porous surface. With such a pre-coat of foundation or cleanser creme, the make-up should be able to be removed completely after every use, leaving a fully cleaned working surface. However most conventional make-up mannequin heads are not provided with such surfaces. Accordingly, conventional make-up mannequin surfaces resist full removal of residual make-up compositions, thus making unlimited use, say in application and repeated practice for training purposes, is not provided. The useful life of the make-up mannequin head is limited. Failure to fully remove the residual make-up environment problems in the long run after completion of their useful life and disposal of such effectively fully used exhausted mannequin heads.

Thus, there is a problem relative to the skin surface as well as a problem of providing mannequins having realistic skin surfaces suited for repeated usage yet having skin surfaces from which practice make-up cosmetics can be easily removed without leaving a retained trace or residue, preventing not only unlimited use of the mannequin and failing to reduce reducing the environmental problems of disposal, but limiting the useful life of such mannequin for providing practice for the earnest trainee.

It would be considerably advantageous to provide a solitary make-up mannequin head with a skin surface that is receptive to plural and repeated application of cosmetic make-up without retaining even surface traces which build-up, reducing the useful life of the mannequin head for the purposes desired and the environmental problem Even if make-up mannequins can be provided with other than the commonly provided Caucasian or standard skin-tone, as mentioned earlier, a plurality of such different skin-tone make-up mannequins are required. Even then, practice heretofore was still required to be performed on live subjects in order to achieve a direct realistic result on prospective clients for their cosmetic products. The graduate trainee generally had been required to use living human models, each having the different colors and skin-tone to demonstrate the differences in make-up applications on persons of different ethnic or racial origin since dark skin-toned persons use different colors of foundation, shadows, etc. than the lighter skin-toned Caucasian, the oriental, the asiatic or the hispanic persons. Further, given the necessity of using different skin-tone human models, the availability of such persons to many trainees is limited even when some are available to few of the trainees. Moreover, fulfiling the required need necessitates substantial expense to keep them available for each trainee for a period of time sufficient for continuous make-up training sessions place to place and for use by the many trainees requiring such contact. The selection of correct skin-tone living models to be representative of the many different ethnic and color-toned persons representing the scope of the likely to be contacted different persons is even more difficult. The range of different skin-tones, facial shapes as well as skin conditions is great so that there are not sufficient numbers of live models with the various skin-tones and the various facial shapes demonstrate and to afford trainee practice thereupon. This is particularly true in the case of beauty schools, trade schools and similar institutions where the numbers of trainees is substantial yet funds are limited preventing a "one-student/one set" instructional program and experience. This is even more of a problem for accredited cosmetology schools and trade schools under the mandates of state professional regulations limiting the use of living models.

The instructional or training arts have long sought means enabling instruction and training individuals in the cosmetic arts, that is, the artistry of ameliorating facial problems by skilled judicious use of cosmetics such as color cosmetic compositions, eye shadow, eyeliner, eyebrow pencil, mascara for eyelashes, lip color, foundation compositions and the like and other make-up products. These arts can be described as the so-called "magical" art of make-up. Such "magical" art involve techniques enabling the creation of different facial shapes from other facial shapes using only colors and shadows provided by the above mentioned cosmetic compositions. Classic facial shapes such as round, oblong, pear-shaped, triangular, inverted triangular, diamond and heart-shaped configurations can be converted one from the other. Moods, differing emotions, various character traits, enhancement of such emotions, moods and reflections of different character traits can be accomplished via the judicious skilled use of relatively simple cosmetic compositions and tools to effect somewhat "magical" transformations. Commonly the so-called "magical" arts are employed in the entertainment fields such as motion pictures, theatrical, operatic, television as well as the advertising and photographic arts, even in the political field. Artistic use of the aforementioned cosmetic products to create the so-called "new image" requires a trained cosmetology practitioner. Such so-called "magical" arts techniques can be and are taught but are learned only by experience and practice.

The cosmetology art has long sought to provide means whereby the teaching of the artistic art of make-up can be facilitated with emphasis on the creative artistic cosmetology technique. Applicant believes that a make-up mannequin can be formed in the configuration of a long-sought "perfect head", one whose facial shape, features, conformations can be transformed by selective artistic employment of various cosmetic compositions and techniques of application thereof. Teaching of these techniques require substantial and repeated practice. The few available living models do little to alleviate the problems of teaching and training individuals in the art of cosmetic transformation technique. The schools specializing in cosmetology even those where not barred by professional regulations, could not afford to use "living models", primarily because of the varients of shape and facial features differ from one to others. The high costs involved in utilization of "living models" is an equally deterrent factor to the employment of such "living models" since the number required would be substantial inorder to meet both the teaching and the practice requirements for quantity of trainees requiring their services.

As mentioned, there are at least eight different distinctive shapes of faces and many more differences between various facial features possessed among individuals having each of said facial shapes. A single living individual model would not provide the teacher and/or trainee with sufficient experience and practice to accommodate instruction and/or practice required for the trainee to learn how to deal with the wide variety of existing individual facial traits.

Make-up mannequin heads presently available in the field do not provide the opportunity for the teacher as well as the trainee to demonstrate and provide for the desired degree of practice of such demonstrable artistry techniques, i.e. transformation and/or convertability techniques. While long sought, provision of a make-up mannequin head having a "perfect shaped head" has not been achieved perhaps because the art yet to define and as well to recognize exactly what would constitute the "perfect head" and how the "perfect head" should appear. Long sought, for example, has been means whereby trainees can be taught techniques exemplifying the "magic" of cosmetics to deal with the application of cosmetics to ameliorate problems possessed by the different shapes and appearance of individuals . . . to modify the actual facial appearance of an individual to result in different desired appearance characteristics.

It is most desirable that the art provide means to encourage the cosmologist's learned skill to be directed to creative efforts to utilize the artistic techniques for application of cosmetics to produce various different facial impressions encompassing changing the visual appearance of the facial configuration of individuals by judicious application of relatively simple cosmetics, such as, for example, shadowing, eyebrow pencil, eye shadow, eye mascara, eye liner and lip color. The mastery of the techniques of cosmetic artistry can convert a round facial type appearance having full cheeks and round chin to a facial type appearance having a broad forehead and chin. Even a heart shaped visage with a wide forehead and narrow chin can be transformed into the appearance of a narrow forehead and wide chin using cosmetic compositions and tools by following the techniques of the artistic make-up artist. The visual impression of an oblong facial configuration can be modified to one having a long and narrow visage by skilled application of shadow and color using only the above mentioned artistic cosmetology techniques upon other classic facial configurations.

With reference to the make-up mannequin and its companion masks, the trainee or student can be taught and can practice the technique of modifying the appearance of such facial problems as deep-set eyes, low forehead, long face, short nose, dark circles under the eyes, under defined cheek areas and receding chin can be improved by use of light foundation, eye disguise and highlighter. Problems which are capable of amelioration can be ameliorated or concealed or literally changed to more pleasing configurations by use of dark foundation or eye disguise such as long nose, large nose, thin nose, hooked nose, crooked nose, pug nose, heavy-lidded eyes, large jaws, double-chin and long chin. Skilled application of eyeliner, eye shadow and eye brow pencil can define improved appearance or actually create the perhaps a more pleasing appearance of small eyes, wide-set eyes, deep-set eyes, close-set eyes and even basic bulging eyes respectively.

The techniques described above are known but the availability of means which can be utilized for training professionals as well as neophytes such as beginning students, commercial cosmetic demonstrators, etc. in the application of cosmetics to persons of varying skin tones and color has not been available at reasonable cost.

Applicant has discovered the definition of the so-called "perfect" or "ideal" facial shape, i.e. configuration is actually the oval facial configuration. Utilization of a make-up mannequin having an oval facial configuration has been found to be capable of use in the teaching and practice of converting such configuration into a desired one of the classic facial shapes using only artistic techniques of applying the above mentioned cosmetic compositions and tools.

Another factor to be considered in the training of make-up technique is the increasing popularity in recent years of permanent make-up or tattooing to provide desired features such as human eyebrows, eyelashes, lip configurations or "beauty spots" directly upon the human skin. Accordingly, it has become necessary to teach these techniques to cosmetology trainees, including professional make-up artists and others skilled in the cosmetic arts. It would be desirable to have the capability to teach such tattooing needle and ink application techniques to cosmetology trainees, professionals and others in the make-up field. Reference has been made above to the necessity of supplementing instruction and demonstration with considerable actual practice. Conventionally, the instruction in permanent make-up technique and the trainee's actual learning of those techniques results by practicing the those taught permanent make-up technique learned involved by tracing pre-drawn eyebrows, eyelashes, lip configurations, etc., on a piece of cowhide or a piece of paper using two-dimensional templates on the piece of cow-hide or paper. Nevertheless, such procedure fails to give the trainee realistic experience in the tattoo technique for permanent make-up applications on or for human facial features. The hand and wrist movements trainees are taught and gained from drawing upon 2-dimensional cowhide or paper cannot truly apply on real human features . . . facial configurations . . . for drawing realistic eyebrows, eyelashes or lip configurations. Such instruction and training which should include training and practice in the use of such tattooing applied to human clients, particularly for use upon clients of different color and/or skin-tone, could not be taught by practice upon human models or human clients since living persons cannot afford to undergo any mistakes made by the practitioner, especially if invoked by the non-skilled practitioner or make-up artist not experienced in the tattooing art. Once the permanent make-up is applied by tattooing, there is no way except painful tattoo removal which can be used to erase the mistake or mistakes.

Therefore, it is desirable, and, in fact, necessary to provide a "tool" in the form of a specialized soft-skin make-up mannequin kit and assorted additional components to enable a trainee to utilize not only for cosmetic purposes but also for the learning and practice of permanent make-up technique by the professional and by the neophyte in the application of such permanent make-up. Such objects have not been available for the training and practice of application for training and practice of permanent make-up (or tattooing).

The nature of presently available make-up mannequins defining the facial portions thereon were difficult to clean and remove applied cosmetic materials therefrom after application thereof to assure use of such make-up mannequin head for repeated applications or for other trainees' use should the mannequin be shared. With a single make-up mannequin, the student is limited to a single skin-tone and, as well, must thoroughly clean the mannequin facial surfaces after each practice, such cleaning being difficult, time consuming and often, incomplete due to the surface provided on the make-up mannequin head. Generally, the skin surface which is suitable for repeated practice make-up applications to be performed thereupon has not been generally provided. For those instances involving the teaching, training and practice of permanent make-up techniques, the useful life expectancy of available make-up mannequins is shortened with each use due to the impossibility of removing tattoo patterns therefrom once they have been applied. It is likely that such make-up mannequin heads would necessarily be discarded and replaced after a substantially shortened period of use, resulting in environmental problems in the disposal of such large numbers of discarded fully used mannequin heads.

The state of the prior art may be indicated by reviewing the patents to Min, U.S. Pat. No. 5,320,535 (Jun. 14, 1994); Mooney, U.S. Pat. No. 4,886,079 (Dec. 12, 1989);, Mooney, U.S. Pat. No. 4,957,124 (Sep. 18, 1990); Narlo, U.S. Pat. No. 5,090,910 (Feb. 25, 1992) and Ito, U.S. Pat. No. 2,968,104 (Jan. 17, 1961).

The Min patent provides a make-up mannequin head for repeated use in make-up practice after use in lieu of a live model subject. The Min make-up mannequin head has at least one human-like face section having a plurality of lip sections and/or single lip formations and multiple eye and/or multiple eye/eye brow formations or single eye/eyebrow formations formed on the single formation. Min also provides a make-up mannequin head having a full facial formation on the front and on the back of the mannequin head, each carrying a facial formation having the aforementioned feature formations. In one example, the facial formations represent a female face and a male face. Each of these formations carry the grouped feature sections representing respectively different sections ones from the others. Another embodiment taught be Min provides a single facial reproduction on one side of the Min make-up mannequin head and a series of plural eye/eye-brow sections. The eye/eyebrow sections may be alike or each eye section respectively may be different from the others. Likewise, the Min make-up mannequin head may carry only various different lip sections on the entire circumference thereof.

It should be noted that the Min make-up mannequin head can have a soft outer surface formed of a resinous material. However, the soft outer surface of the Min make-up mannequin head has only a single skin-tone or color. Thus, to enable the make-up artist, trainee or professional to experience dealing with individuals of different color skin-tones respectively representative of Asian-American, African-American, Caucasian, Native-American and/or Hispanic persons, the cosmetic industry trainee groups or the educational facility must purchase make-up mannequin heads of each different color and/or color skin-tone. In instances where the educational facility does not purchase the makeup mannequin heads for use by the students, etc., the individual student, trainee, make-up artist or other professional must purchase a collection of the different colored or skin-toned make-up mannequin heads for gaining experience in dealing with the aforementioned different individuals. If the various cosmetic compositions, such as different foundation, skin-cleanser, skin creme, eye and eye brow make-up compositions, special cremes, eye and eye-brow make-up, lip colors, shadows and the like are not provided by the educational facility, the individual student, etc., must purchase these materials suitable use upon each of the different individuals representative of the different ethnic and/or racial groups whom they will experience in the course of their practice for creating make-up particularly suitable for each of these persons. The cost is prohibitive because the adequate course of study must provide the user experience sufficient to treat each of the personna groups having different facial characteristics, in particular, color and/or facial characteristics. It is important that Min does not means for employing a single make-up mannequin head to enable the student, etc., to learn and to practice the suitable cosmetic application techniques for dealing with the plural ethnic and/or racial types except by purchasing plural make-up mannequin heads, each of a different color and/or skin-tone.

Narlo provides a three-dimensional facial display model capable of being changed in form, quality or nature to display each of the classic facial shapes. The make-up mannequin taught by Narlo comprises a skull-form base formed of plastic, rubber, plaster or other material. The forward portion of the base is formed with a countoured support surface for temporarily mounting various shaped facial display components. These support surfaces provide underlying shaped support surfaces to receive selected ones of forehead components, cheek components, jaw-bone components, nose components, alternative eye components, mouth components, plural shaped eyebrows and plural shaped mouth components. Each of these components are formed by moulding a rubber polymer or plastic material which resembles the resilient texture of human skin. The various classic forms are replicated by selection of proper components and fitting selected ones onto the preformed selected underlying receiving areas of the base model.

Thus the single Narlo model can provide the means for constructing and installing each of the seven basic facial shapes one at a time upon the make-up mannequin head, thus enabling the cosmetician trainee, student or professional to develop make-up application experience by routine practice upon those classic facial shapes. However, the resulting various shaped model (or mannequin head) fails to provide means whereby the user can learn, experience and practice the conversion, only by skilled use of make-up, of one classic facial configuration into the selected one of the other classic facial configurations each of the seven basic facial shapes upon the model make-up mannequin head by use of cosmetic make-up techniques. The artistic technique of change-over is an invaluable skill to be obtained in an adequate course of make-up and cosmetology study. The multiplicably applied interchangable components or pieces forming completed ones of the various facial configurations one at a time do not serve to teach or to provide practice the artistry of cosmetic application resulting in conversion between classic facial shapes via sole use of cosmetics.

Narlo is not concerned with the teaching, training or practice relating to the use of cosmetics upon individuals of different ethnic and/or racial types and does not disclose or teach means whereby a single make-up mannequin head can be employed for enabling the cosmetitian trainee, student or professional to gain practical experience in dealing with the different racial and/or ethnic individuals having the different characteristic skin colors and/skin tone.

Mooney offers a cosmetic template formed to shape by heat and applied against the face of an individual in a heated condition in situ to assume the facial shape of that individual. A plurality of small circles are marked on the formed sheet to define the contour lines. The formed sheet is removed and holes are formed in each of the circled areas along the contour lines. An elastic band is secured to what then has become a mask. The thus formed mask is remounted to the individual's face and a cosmetic pencil is extended through the holes onto the face of the individual marking the lines onto the individual's face along the represented contour lines defined on the mask. Cosmetics then are applied in accordance with the pencil guidelines formed on the individual's face. Thus, Mooney'079 provides means for providing visible guidelines upon a client's face rather than providing means for instructing make-up trainees, make-up artists, cosmetologist or cosmetician professionals in the art of either of technique for make-up application or for artistic cosmetology. Mooney'124 is directed to a method of making the above mentioned mask and offers no teaching which would be expected to lead to solution of the various problems discussed above in the teaching and training of cosmetology specialists.

Ito does disclose a head model which extends to the upper breast as a unit and is formed of a molded, thin-walled shell formed of relatively soft plastic material, such as polyvinyl chloride, the shell being filled with a relatively soft foamed material such as granular foamed polyethylene. Ito asserts that the head model can be used in exercising make-up, beauty culture, facial massage and like training where the user can feel substantially the same touch as that of the living human face. However, the principal purpose of the Ito head model is for hair styling training. Hair being firmly and fixedly attached to the shell by passing the hairs through the shell wall at the top of the model head. The provision of providing the head model with a unique facial configuration which is instrumental as a teaching aid for make-up application either cosmetic or permanent is not taught by or obvious from the Ito teachings. The concept of combining the Ito head model with flexible soft-skin masks having the facial configuration identical to and duplicative of that of the head model. Recognition of the problem of teaching trainees and students cosmetic make-up application which takes into account the differences in the facial skin tones and color of different ethnic and racial individuals likely to be encountered in the practice of cosmetoloty is not present in the Ito disclosure. Absence of such recognition clearly indicates the failure to provide a solution to such educational problem.

The state of the art fails to provide any equivalent solution comprising the provision of the said masks, where each of the said masks are provided with the skin tone and color representative of the different ethnic and racial persons likely to be encountered by the trainee or student in practice and which are selectable for mounting on the hair model to provide a working surface is absent from the Ito disclosure.

Likewise, Ito does not provide any teachings to the art leading even to the conception or teachings which would lead on skilled in the art to the include the hair model with other training or teaching components that will be utilized by the trainee or student in a single kit so that the trainee or student will be able to have available the full complement of "tools" and compositions required in the training exercises in one portable package. The concept of providing a teaching, training and practice kit wherein the trainee or student has at hand the availability of all the implements and compositions in a portable kit, which kit can employed at school and enable practice at home.

SUMMARY OF THE INVENTION

The invention provides a cosmetology training, teaching and practice system and method utilizing a soft-skin make-up mannequin head having the "perfect" or "ideal" facial configuration both for use in the teaching and practice of cosmetic make-up techniques and, as well as the teaching and practice of permanent make-up techniques. Given the use of the forementioned soft-skin make-up mannequin head for training and practice of both said techniques, it is important that each trainee be provided with the most convenient arrangement for employing the tools employed in the instruction and required practice by each trainee of each of said techniques.

Accordingly, the invention provides a make-up mannequin kit including the soft-skin make-up mannequin head as a base carrying a "perfect" oval facial configuration so as to provide for instruction and practice of either/or both conventional cosmetic make-up techniques and the permanent cosmetic make-up techniques. The make-up mannequin according to the invention is formed of one color skin-tone, preferably Caucasian, and can be formed with either open or closed eyes (and appropriate eye-lids), and, plural elastic stretchable masks carrying the facial configuration identical to that of the make-up mannequin head and adapted to be mounted removably thereupon. The companion masks each have different skin tones and colors representative of the commonly encountered individuals of different ethnic and racial origin capable of respectively being mounted upon the make-up mannequin thus enabling the trainee or student hands on experience in learning and practice upon individuals of varied ethnic and racial origin. The trainee, student and instructor can select a companion msk representing one of the ethnic and racial groups giving the student the experience in dealing with such individuals and their particular needs. The selected companion mask is stretched to slip over the make-up mannequin head and, because of its resilience and elasticity, spring back securely, self-adhered thereto. in place, enabling the trainee or student to select the appropriate companion mask on which to learn, practice and operate.

The system and method of the invention involves selection of one of the companion masks and stretching and fitting the selected companion mask onto the make-up mannequin head.

Further, the invention provides the make-up mannequin head with a flat back provided with an increased elevation at at the upper end thereof so enable the trainee to practice the make-up techniques involving working upon "real" persons or live models during training or post-training where the "real" person who is positioned on his or her back, with their head angularly elevated, as would occur when resting upon a pillow with the facial configuration looking upwardly. The mannequin of the invention can be provided with a base having a mounting-hole capable of being inserted onto a table-clamp in upright or in angled positions to enable the trainee to practice make-up techniques upon a person who may be sitting in front of the trainee during the process of make-up application.

The invention further includes the provision of a sufficient number of individual resilient, elastized companion facial masks duplicative of the oval facial configuration carried by said make-up mannequin, said companion masks being formed of soft resilient elastic material and including at least one mask having a color and skin-tone representative of the common ethnic and/or racial origin and, preferably, providing each of the three common ethnic and/or racial origin such as the light and dark skin-toned African (or Afroamerican), Oriental (Asiatic) and Hispanic origin. Each of said masks are adapted selectively to be stretch-fitted one at a time onto the soft-skin make-up mannequin head closely seated engaged with the oval facial configuration carried by said soft-skin make-up mannequin head. Each of the masks can be fitted over a previously applied mask carried by the make-up mannequin of the invention. The masks all can be stretch-fitted one over the other onto the make-up mannequin head of the invention for convenient storage and carrying in a container, flexible or not, along with the accompaning components of the make-up mannequin kit. The instructor demonstrates the techniques the trainee or student is to use on the selected companion mask. The instructor describes and illustrates the application of the cosmetics and the techniques to be followed. The trainee or student attempts to apply the teachings via the mounted companion mask. The exercises involve plural attempts by the trainee or student to master the techniques taught by application of the appropriate cosmetic compositions, the shape of the application, the locations of the lines, shadings, etc. The task is trial and error with each application being erased after each attempt, the surface being cleaned by use of cleansing creme applied thereto.

The subject mannequin kit contains all the materials and implements, as well as printed instructional text and examples to enable the trainee or student to be taught the art and to practice same upon the "model", i.e. companion mask, without the necessity of having a living model available for each trainee or student or even for lecture demonstrations by the instructor The companion masks can be recyclable. The soft-skin make-up mannequin head of the invention is formed of a resilient soft finely porous material simulative of the texture of human skin having only one of said common ethnic and/or racial origins, preferably of Caucasian origin. The soft-skin make-up mannequin may have the color and/or skin-tone of one of the other ethnic and/or facial origin, in which case, a mask member having the skin-tone and/or color of the ethnic and/or skin-tone of the replaced facial configuration for which the said other ethnic and/or facial origin was substituted as carried on the master soft-skin make-up mannequin.

The soft-skin mannequin head and masks according to the invention are provided as components of a instructional and practice make-up mannequin kit additionally including at least one series each of plural exemplary eyebrow templates, plural and exemplary eye-brow pencils, eyelash pencils, applicator brushes and plural cosmetic compositions, including shadowing, shading, blush, rouge, foundation and cleansing creme cosmetic compositions and other applicator tools.

The make-up mannequin head carrying the oval "perfect" facial configuration facial formation according to the invention and the companion masks can be combined with appropriate needles and inks for effecting for permanent make-up applications, as independent permanent make-up kits for such applications or can be included as a part of the make-up mannequin kit previously described. Both the cosmetology make-up mannequin kit and the permanent make-up mannequin kit can include additional duplicative companion elasticized masks also can be included, and, optionally, the mannequin kit also can include appropriate table clamps for mounting of the mannequin head (s) thereon enabling various positional orientations to be effectable.

With such make-up mannequin kits, the trainee, whether professional or neophyte, will have conveniently at hand all the necessary materials for the training and practice of either or both the conventional cosmetic make-up and the permanent make-up technique as well as each of both techniques, including the practice and teaching of cosmetic make-up techniques, including the art of artistic cosmotology, and of permanent make-up techniques with every required element present in one unit for selective use by the individual student, trainee, professional or neophyte, demonstrator or practicing cosmetologist. The invention thus provides a long sought but heretofore unfulfilled cosmetology teaching and practice aid.

BRIEF DESCRIPTION OF THE DRAWINGS

FIG. 4 is a rear elevational perspective view of the make-up mannequin according to the invention illustrating the three companion mask members telescopically mounted one upon the other thereon as for carrying or storage;

FIG. 5 is a rear elevational view of the soft-skin make-up mannequin head according to the invention;

FIG. 11A, 11B, 11C and 11D are plan views of four examples of eyebrow stencil templates of the type included in the make-up mannequin kit according to the invention, FIG. 11A illustrating a common arch eyebrow template; FIG. 11B illustrating a straight eyebrow template, and FIG. 11C illustrating a cornerarch eyebrow template and FIG. 11D illustrating a natural arch eyebrow template;

FIG. 12 is a side elevational view of one type of the table clamp which may be included in the make-up mannequin kit according to the invention, the broken line representation illustrating the 180 degree swivel capability of the holder thereof;

FIG. 14A illustrating the round facial configuration, FIG. 14B illustrating the square facial configuration, FIG. 14C illustrating the pear-shaped facial configuration, FIG. 14D illustrating the heart shaped facial configuration, FIG. 14E illustrating the triangular shaped facial configuration, FIG. 14F illustrating the oblong facial configuration, FIG. 14I illustrating the diamond shaped facial configuration, FIG. 14J illustrating the inverted-triangular facial configuration; FIG. 14G illustrating the "perfect" or "ideal" oval facial configuration of the make-up mannequin head according to the invention;

FIGS. 15A–15E illustrate the various commonly encountered eye-formations on which the cosmetitian trainee or student is taught methods to apply eye-shadow make-up upon the make-up mannequin according to the invention; FIG. 15A illustrates the typical oriental eye formation with FIG. 15A' showing the method of applying eye shadow to such eye formation of FIG. 15A; FIG. 15B illustrates the typical mature eye formation with FIG. 15B' showing the method of applying eye shadow to such eye formation of FIG. 15B; FIG. 15C illustrates the typical deep set eye formation with FIG. 15C' showing the method of applying eye shadow to such eye formation of FIG. 15C; FIG. 15D illustrates the typical close-set eye formation with FIG. 15' showing the method of applying eye shadow to such eye formation of FIG. 15D; FIG. 15E illustrates the basic bulging eye formation with FIG. 15'E showing the application of eye shadow to the eye formation of FIGURE E;

FIG. 17A through 17I are representative illustrations of the various types of lip outlines of lip configurations which may be encountered in the course of applying cosmetic make-up to persons of varied ethnic origin and particularly employing the make-up mannequin kit of the invention for training instruction and practice in the art of using permanent make-up using a tattoo process.

DESCRIPTION OF PREFERRED EMBODIMENTS

Figure 1:
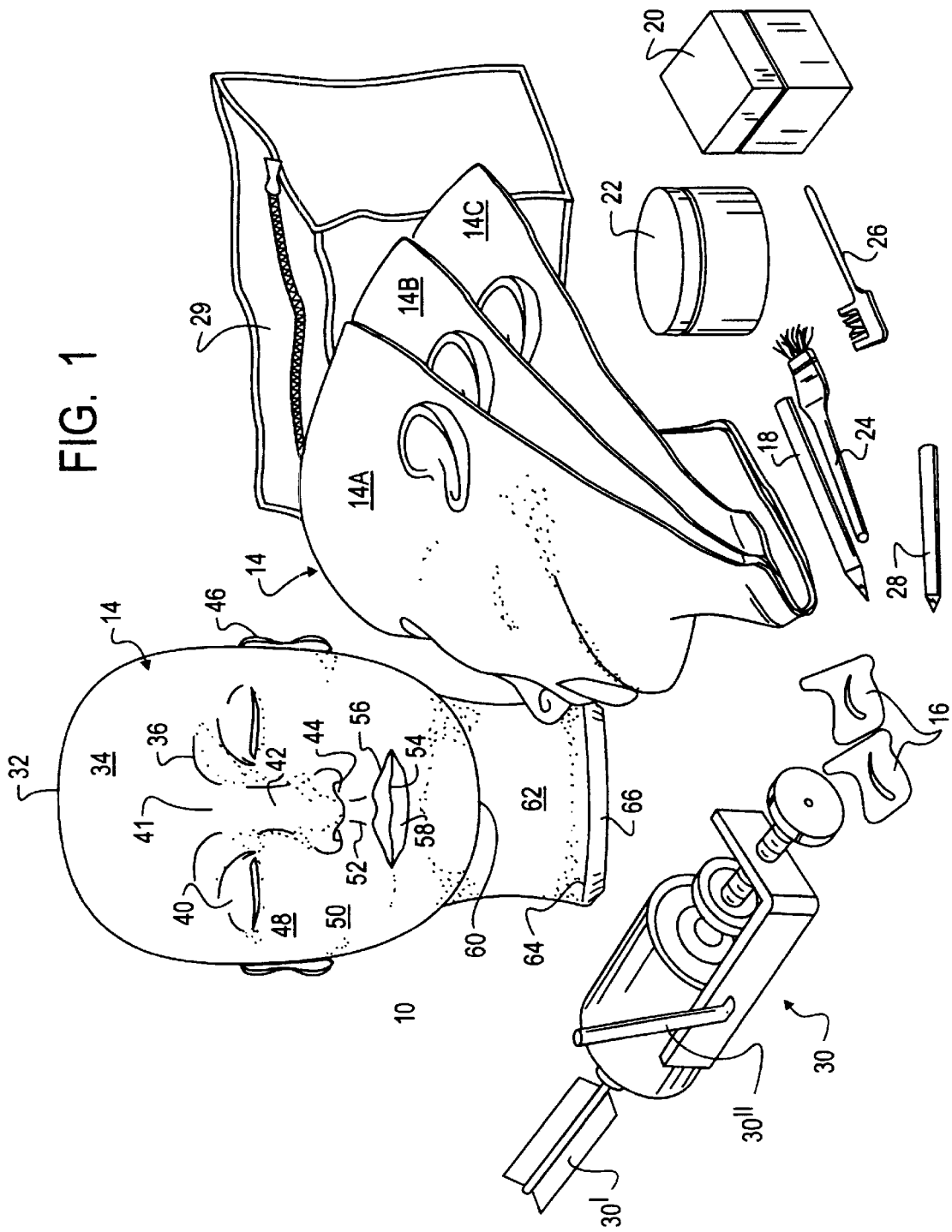
FIG. 1 is a front perspective view of the preferred embodiment of a make-up mannequin kit according to the invention illustrated with the preferred components thereof.
Figure 3:
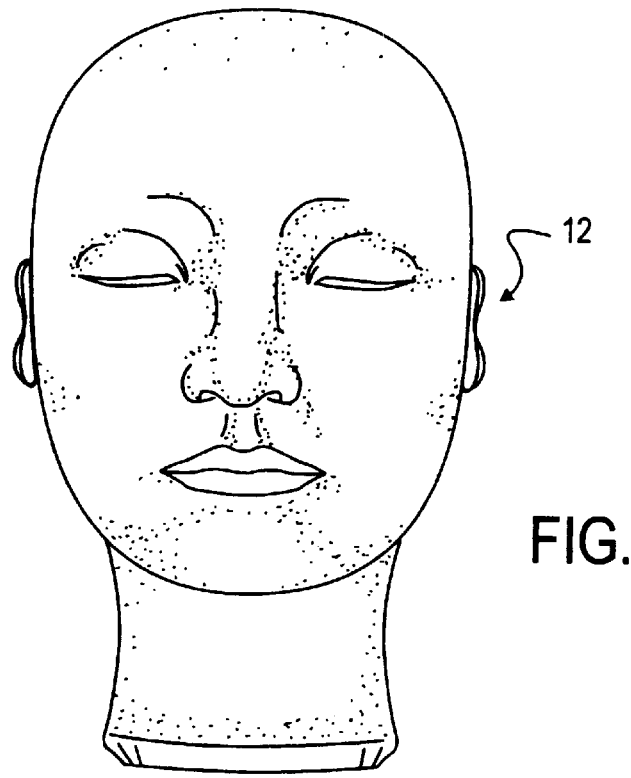
FIG. 3 is front elevational view of the soft-skin make-up mannequin illustrated as a component of the make-up mannequin kit according to the invention shown in FIG. 1.
Figure 2:
FIG. 2 is an elevational view of the soft skin make-up mannequin illustrated in FIG. 1 but rotated about 20 degrees to the left.

Referring to FIG. 1 wherein the make-up mannequin kit according to the invention for the training and practice of dermal cosmetology, said make-up mannequin kit being designated generally by reference character 10 and is characterized by the presence of the soft-skin make-up mannequin head 12 having a facial configuration which can be termed a "perfect" or, equally considered, an "idealized" make-up mannequin head. The make-up mannequin head characterized as a so-called "perfect" head has an oval facial configuration whose shape, features and conformations can be transformed by selective artistic employment of various cosmetic compositions and techniques of the applications thereof. The oval shape of a human facial configuration falls into the middle of all facial shapes as illustrated, for example, in FIGS. 14A through 14H.

Referring to FIG. 1, the make-up mannequin kit 10 includes, in addition to the soft-skin make-up mannequin head 12, at least three flexible, resilient and stretchable soft-skin companion masks 14 being duplicate exact reproductions of the facial configuration of the "perfect" or "ideal" make-up mannequin head 12. Each of the soft-skin masks 14 are formed from polyvinylchloride (PVC) plastic material which is resilient and elastic. Each mask 14 has a skin-tone and color representative of the skin-tone and color of a different one of the principal skin-tones and colors of ethnic or racial types encountered throughout the world. For example, mask 14A is provided with a skin-tone and oyster color representing Oriental (Asiatic) skin-tone and color. Mask 14B is provided with a skin-tone and satin-brown color representing the Hispanic, i.e. Spanish-American, light or medium brown. Mask 14C is provided with a skin-tone and dark or bittersweet chocolate color or brown skin-tone representing African origin. An additional mask (not shown) which has a white skin tone and color can be included so as to supplement the normally produced white soft-skin make-up mannequin head, such skin tone and color being representative of a Caucasian individual. One or more additional companion masks also can be included as components of the make-up mannequin kit 10 of the invention. In particular, the companion masks having a Caucasian skin tone and color are included in the companion mask group of the make-up mannequin kit 10 when the make-up mannequin kit 10 is intended for the teaching, training and practice of the techniques of permanent or tattoo make-up. In the course of teaching, training and practice of permanent make-up techniques, the neophyte or unskilled individual the neophyte or unskilled individual in the art of permanent or tattoo make-up technique would be expected to make plural mistakes which would require fresh masks for replacement. Such mistakes would reduce the available practice area of one mask, thus requiring additional companion mask or masks 14 for substitution for the worn masks. Likewise, additional ones of the other masks also could be included in a single make-up mannequin kit 10, where the make-up mannequin is intended for use both in the teaching and practice of both cosmetic make-up application and permanent or tattoo make-up application.

With respect to the training and practice of permanent make-up technique, such technique does not require companion masks of different skin tone, hence the replacement companion masks 14 which are included in the make-up mannequin kit 10 which may consist only of Caucasian skin-tone and color (or simply white) since the color and/or skin-tone is not important when tattooing is practiced. However, all four of the skin-toned masks can be employed for the teaching and practice of said permanent techniques involving tattoo procedures. The trainee or neophyte would not use the basic make-up mannequin head 12 for training and/or practicing the permanent or tattoo technique and hence the primary practice in such art would take place using a selected Caucasian or white color replacement companion mask 14. Application and/or practice utilizing the basic Caucasian color/tone make-up mannequin head would generally be limited to make-up cosmotology.

The mannequin kit 10 also includes a series of four eyebrow templates 16, particularly illustrated in FIGS. 1 and 11, which represent the most common eyebrow shapes existing on human beings. The eyebrow templates are useful not only for cosmetic application and practice but also for permanent (or tattoo) make-up training and practice. The eyebrow templates provide the trainee with the opportunity to learn how to trace the selected eyebrows on particular facial shapes followed by finishing the details of the eyebrows by drawing same using eyebrow pencils. With the experience so gained by repeated practice, the trainee or student will be able to draw the desired shapes free-hand and apply such skills in their professional practice, producing the symetrical satisfaction of achieving the desired eyebrows. The eyebrow templates illustrated in FIGS. 11A–11D carry the left eyebrow shapes which can be switched to represent the right eyebrow shape simply by inverting or flipping over a respective one of the illustrated templates to utilize same to guide the drawing of the right eyebrow.

The use of each of the eyebrow templates is easily understood. First, a selection of the desired shape of the eyebrow stencil template is made that is closest to the natural eyebrow shape of the client. The template then is gripped by using the thumb and index finger at locations thereon identified for left handed or right handed operators. The template then is positioned above the eye and lined up with the end of the eye where the tear duct is located, generally at one corner of the eye. A eye brow color applicator with color or any color eye brow pencil selected from those included in the mannequin kit 10 and used to shape or fill in the open area of the template. The template is removed and the eyebrow created can be modified as required to complete the creation. After a short period of use and experience, the user soon will be sufficiently skilled to enable the user to apply the eyebrow image creatively free hand.

The inclusion of the various eyebrow configurations provides the trainee with learning and practice in the tracing of the eyebrow shape on the appropriate mask for the particular ethnic or racial origin of the individual client. The acquired skills are useful in meeting the challenges encountered in the cosmetologist's art and useful for cosmetic make-up application and practice as well as for permanent (or tattoo) make-up training and/or practice).

As shown in FIG. 1, the mannequin make-up kit 10 can include additional components such as eyebrow pencils 18, boxes 20 and/or jars 22 respectively holding foundation creme cosmetics, blushes, shadowing cosmetics, cleansing creme compositions, eye liner, mascara for the eyelashes, lip color and other make-up products including shadowing, shading, blush, rouge and touch-up, shadow brushes such as exemplified by shadow brush 24, eye-lash combs such as exemplified by eye-lash comb 26 and make-up pencils such as make-up pencil 28, of light, dark or other specific colors. Additionally, as shown in FIG. 1, at least one make-up mannequin head holder/stand 30 is preferably but optionally included as a component of the make-up mannequin kit 10. Also, as illustrated in FIG. 1, optionally included is a light-weight carrying container exemplified by the container represented by reference character 29 in FIG. 1. Provision of this light-weight carrying container and the light weight of the components of the make-up mannequin kit, makes the make-up mannequin kit portable and enables the user . . . teacher, trainee, student and even professional, easily transport the kit anywhere it is required.

Such mannequin head holder/stand 30 is capable of being clamped, such as upon the edge of a table or other platform, for mounting the make-up mannequin head 12 to enable the make-up mannequin head 10 of the invention to be oriented in varied stable working positions. Examples of such make-up mannequin head stand are illustrated both in FIG. 1 and in FIGS. 10 and 12, respectively are designated generally by reference character 30 in FIG. 1 and in FIGS. 10 and 12.

The make-up mannequin head 12 of the invention is constructed by first forming an accurate model in the form of a human head of desired size and shape, with the structural features, such as the cranium 32, forehead 34, brow formation 36, eye-brow formations 38, closed eye-lid formations 40, a nose formation 42, including nostril conformations 44, ear formations 46, upper and lower cheek formations 48, 50, upper lip formation 52, mouth formation 54, including upper and lower lips 56. 58, chin formation 60, throat formation 62 and neck formation 64, terminating with a base formation 66.

Figure 7:
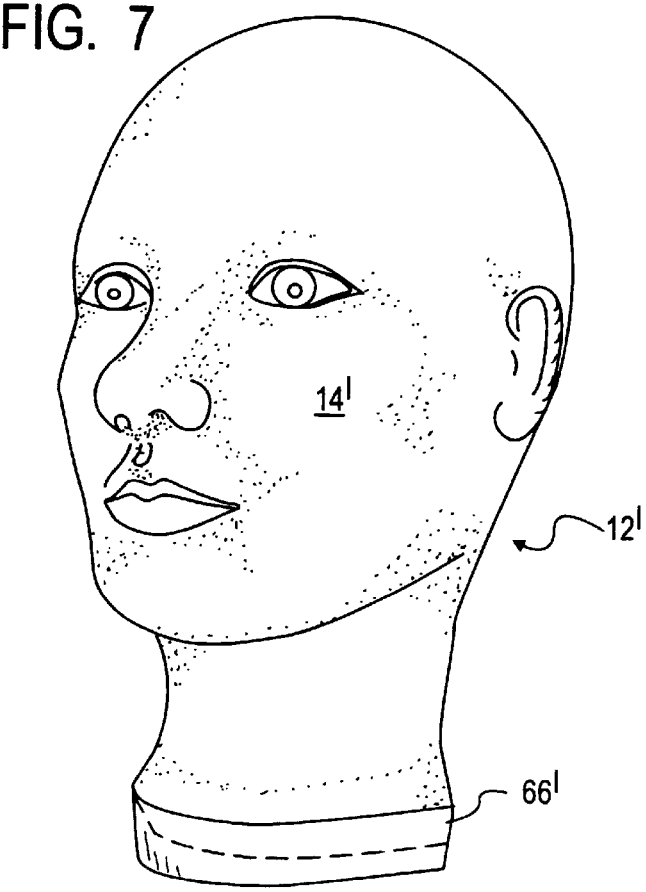
FIG. 7 is an elevational view of a modified embodiment of the soft-skin make-up mannequin head according to the invention which is particularly suited for training instruction and practice in the art of permanent make-up using a tattoo process.

The modified make-up mannequin head designated by reference character 12' as illustrated in FIG. 7 is open-eyed and the companion masks 14' intended to be utilized with said open-eyed make-up mannequin head 12 also carries the eye formation with the eye-lids equivalent to their disposition in their open-eyed condition. Both said make-up mannequin head 12' and the companion 14' have the same oval facial configuration and are formed by the same method as used in the formation of said make-up mannequin head 12 and its companion masks 14. The modified make-up mannequin head 12' in FIG. 7 is illustrated as having a rigid base member 66' which is introduced into the open bottom end (not shown) of the make-up mannequin head 12', said base member 66' having an interior blind end passage (not shown) opening to the exterior of the base member 66' so as to provide a receptacle for the stem of the support stand 30.

The accurate model is formed by first forming a plaster mold of an individual by conventional techniques. Such mold may be formed by direct copying an existing mold or using a real person. The resulting plaster mold is modified by carving and addition technique, to develop a final "look". A wax mold is formed from the final plaster mold. Then, the wax mold is used by the conventional electrolytic process to form a brass mold identical in features to the wax mold. The exact shape or line of the final plaster mold will be reproduced precisely on the brass mold. Thereafter, the wax mold is melted by a heat source, leaving the brass mold shell, same comprising the useful brass mold.

The brass mold, so finished, will be employed to form the mannequin head as well as the several flexible masks of the mannequin head.

The brass cavity mold can be of the type employed for the injection blow molding process or can be a mold into which a liquid polymer is introduced, the mold then sealed and subjected to polymerization condition.

The molding process for forming the make-up mannequin head of the invention as well as the molding process for forming the representative mask members are similiar. The molding process is a two step process, the first molding step is to form a uniformly thick soft human skin-like coating interior of the brass mold to form a polyvinyl chloride lining. The polyvinylchloride lining preferably comprises an approximate minimum thickness of 2 to 3 mm. which forms the "soft-touch" outer hollow shell of the soft-skin make-up mannequin head. A solid slush form of polyvinyl chloride (PVC) resin is liquified by appropriate application of high temperature heat. The mold release conventionally is sprayed on the inside wall of the brass mold before the introduction of the liquified PVC so as to permit removal of the finished body can be released from the mold. After the indicated amount of the liqified PVC is introduced into the brass mold, quickly rotating the said mold to assure coating the interior wall of the mold evenly with the liquid PVC covering the interior wall of said mold. The mold then is placed in an oven having a fixed temperature for exposing the PVC coating thereto for baking the PVC within a minute. When the said molten PVC has been sufficiently heated to polymerize, the mold is removed from the source of heat, i.e. an oven, and placed inside of a hard block mold having the same expression of facial configuration of the make-up mannequin head, i.e. and of the PVC companion mask, the latter being formed by removal of the back portion of the shell after the mold is cooled and the shell removed from the mold once the mold is cooled, as in a cold water bath. The PVC mask then is formed, the mask carrying the features of the brass mold and can be removed.

Once the PVC shell has been made, the forming of the make-up mannequin head is continued. The flexible PVC shell is placed inside of a hard block mold having the same expression of the PVC mask. The bottom part of the hard block mold holds the face of the PVC shell, the face thereof directed downward therein. The top part of the hard block mold holds the rear part of the PVC shell. The top and bottom parts of the hard block mold are clamped together allowing no space for the shell to expand . . . or balloon . . . during the next to occur foaming process in forming the make-up mannequin head.

A fixed amount of a liquid polyurethane foaming material then is injected into the hollow PVC mask within the hard block mold through the bottom opening of the mask and a cap is placed into the bottom opening of said mask.

One formulation of polyurethane, known as PU 1108 (from Bayer, GBH, Germany) is combined with an activator sold under the trademark DESMODUR (from Bayer, GBH, Germany) and Freon II (E.Dupont & Co.) is introduced to the polyurthane/activator mixture, said mixture comprising, for example, 1 liter of Freon II mixed with 3 gallons of the PU 1108 polyurethane. An equal portion of the PU polyurethane/freon II mixture is mixed with an equal portion of the DESMODUR activator and introduced simultaneously to result in a mixture which will form a hardened foam within the PVC mask, forming the make-up mannequin of the invention.

The activated foaming material assumes the hardened form in several minutes. The replacement mask is formed by severing the top face of the resultant mask taken from the back of the flat bottomed replacement mask.

The material used for the erasable make-up mask is a silicone elastomer giving to the mask a smooth finished surface so as to eliminate possible build-up of make-up composition as application and erasure of make-up is repeated during use of the mask. The PVC material preferably is selected for use to form replacement masks used for permanent, i.e. tattoo, techniques while the silicone elastomer is used to form erasable masks. PVC masks also provide a smooth surface for the masks, but results in the ultra-fine pin holes hardly detectable to the naked eye. Since the pin holes nevertheless continuously entrap the residue make-up to the surface so that the PVC surface, the said residue make-up appears as a obvious residual mark. The silicone elastomer results in a surface free of any pin holes, the waste make-up being carried off the surface of the mask by a paper or cotton towel. The silicone mask can be used repeatedly, easily providing a new erasable surface. The PVC mask better serves as a disposable permanent make-up mask due to the PVC mask's non-erasability surface characteristic and its very limited reuse except for recycling disposal.

Alternatively, the hard mold can be formed with a planar surface having a small opening into which a removable plug can be introduced to close said opening after the polyurthane foaming polymer mixture has been introduced. The resulting foam will fill the interior of the mold. The plug will define a cylindrical blind passage 68 opening to the exterior of the molded product when the plug is removed subsequent to curing of the foamed interior of the mold. The planar portion of the mold produces the flat back of the make-up mannequin head.

It also is possible to have a large opening 72 formed in the back of the make-up mannequin 12 during the molding thereof, said opening being the entry opening in the mold for introduction of the polyurthane foaming material. A complementary polyvinyl chloride disc 74 (FIGS. 4 and 5) can be sealed therein to close off the opening then created.

Likewise, the base of the mold also can carry means to create an opening therein which can be plugged with a removable cylindrical plug or cap. Thus a cylindrical blind-ended passage 68 (FIGS. 8 and 9) can be formed opening to the base 66' of the completed make-up mannequin head 12 for supporting the resulting make-up mannequin head 12 on the stem 30' of the stand 30.

The make-up mannequin head 12 illustrated in FIGS. 4 and 5 is provided with a flatback 70 with an additional two inch elevation formed as a part of the flatted-back of the make-up mannequin head so as to result in a realistic elevational position as would appear when the human would lie on "her" back with the head thereof resting upon a pillow and the head tilted to face angularly upward. Thus, when the make-up mannequin head 12 rests flat upon a surface, such as a table, the trainee would apply make-up to the facial configuration of the make-up mannequin head when it is oriented in the same attitude simulative of an actual person undergoing the make-up application. This elevational representation and positional attitude is represented by the broken line 10—10 taken vertically through the make-up mannequin head 12 mounted on a holder-stand 30 in FIG. 10 and comprises an elevation approximately of two inches formed at the upper portion of the back of the make-up mannequin head.

Figure 10:
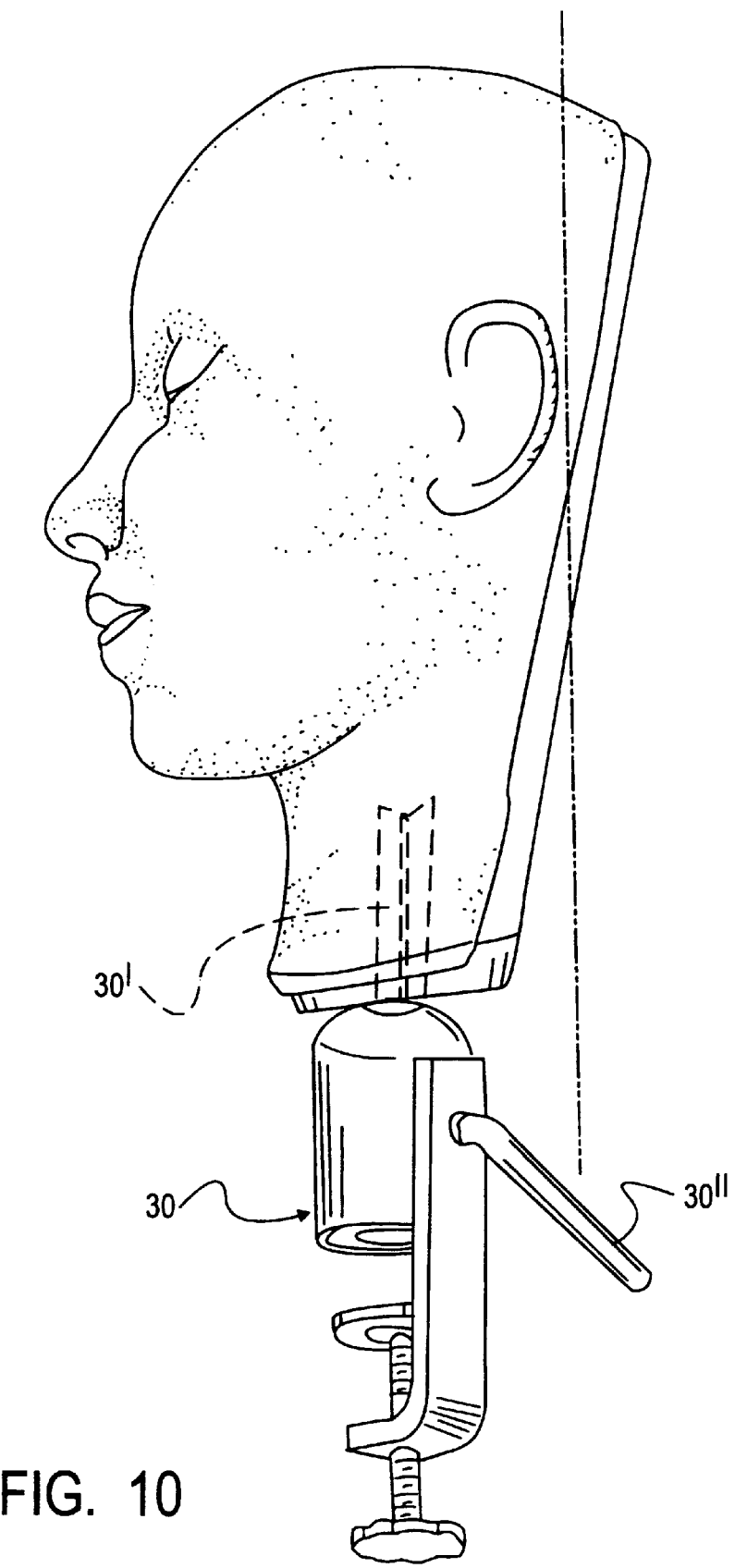
FIG. 10 is a side elevational view of the soft-skin make-up mannequin head of the invention carrying a flexible resilient elasticized companion mask mounted thereon and the resulting combination itself being mounted on a table clamp included in the make-up mannequin kit illustrated in FIG. 1.

As shown in FIGS. 4,5,7 and 8, the make-up mannequin head 12 includes the flat back 70 having the polyvinyl chloride disc portion 74 covering the otherwise open circular section resulting from the entry portion of the mold through which the foaming polymer agent is introduced. The disc portion permanently is sealed to complete the flat back. Where provided, the blind passage 68 is shown in FIG. 10 as receiving the top stem 30' of the holder/stand 30 with the make-up mannequin head 12 oriented vertically raised above the level of the working table or platform (not shown). The orientation or attitude of the vertically mounted make-up mannequin on the stem 30' of the stand 30 can be oriented angularly by manipulation of the handle 30" of the stand, as shown in FIGS. 10 and 12. With the presence of the elevation of the flat back as heretofore described, the make-up mannequin head 12 or 12 can be placed resting horizontally on the table or working platform (not shown) during practic or mounted on the holder-stand with the facial configuration appearing to look straight ahead—upright—as if the client represented by the make-up mannequin head 12 was leaning forward while sitting upon a stool or high-backed chair when being served by the cosmetitian.

These available positions can provide simulation of the actual position of the human head of a client when the make-up application is performed at the reclining or lay-down position or at the sitting position of the client.

The make-up mannequin head 12 has a smooth facial surface with Caucasian or white color skin-tone. The surface, being formed of the flexible material, has a softness and resilience simulative of human skin enabling the trainee (student) to obtain realistic experience with application and/or practice on human facial features. This is particularly advantageous over the hard, unyielding surface of most conventional mannequin heads.

In fact, the outer surface of the mannequin head of the invention is amenable to application of massage treatment by the trainee, if teaching and/or practice of such art is a subject for experience by the trainee in the course of study engaged by said trainee.

In practice, since the make-up mannequin kit includes containers 22 for a foundation or cleansing creme, such cosmetic can be applied over an area of the facial configuration of the make-up mannequin before application thereupon of any of the make-up compositions, thereby to cover and effect a sealing result to overcome the fine pin holes characteristic of the PVC material. The applied cleansing creme can overcome or at least ameliorate the practically invisible porosity of the PVC surface to prevent the make-up from penetrating the PVC surface or being trapped inside the practically invisible pores of said surface. When the trainee (student) practitioner is ready to erase the make-up after the exercise has been completed, all that is required is the application by the trainee (student) to use a paper towel or paper with cleansing creme to wipe the applied make-up from the mannequin's face. This enables the trainee (student) to have an unlimited use of the said make-up mannequin head during the course of make-up training (study).

Attention is directed to the FIGS. 13A and 13B wherein a preferred embodiment of the make-up mannequin according to the invention is illustrated with selected dimensions of the facial configuration thereof diagrammatically set forth in the following TABLES I AND II:

TABLE I

Figure 13A:
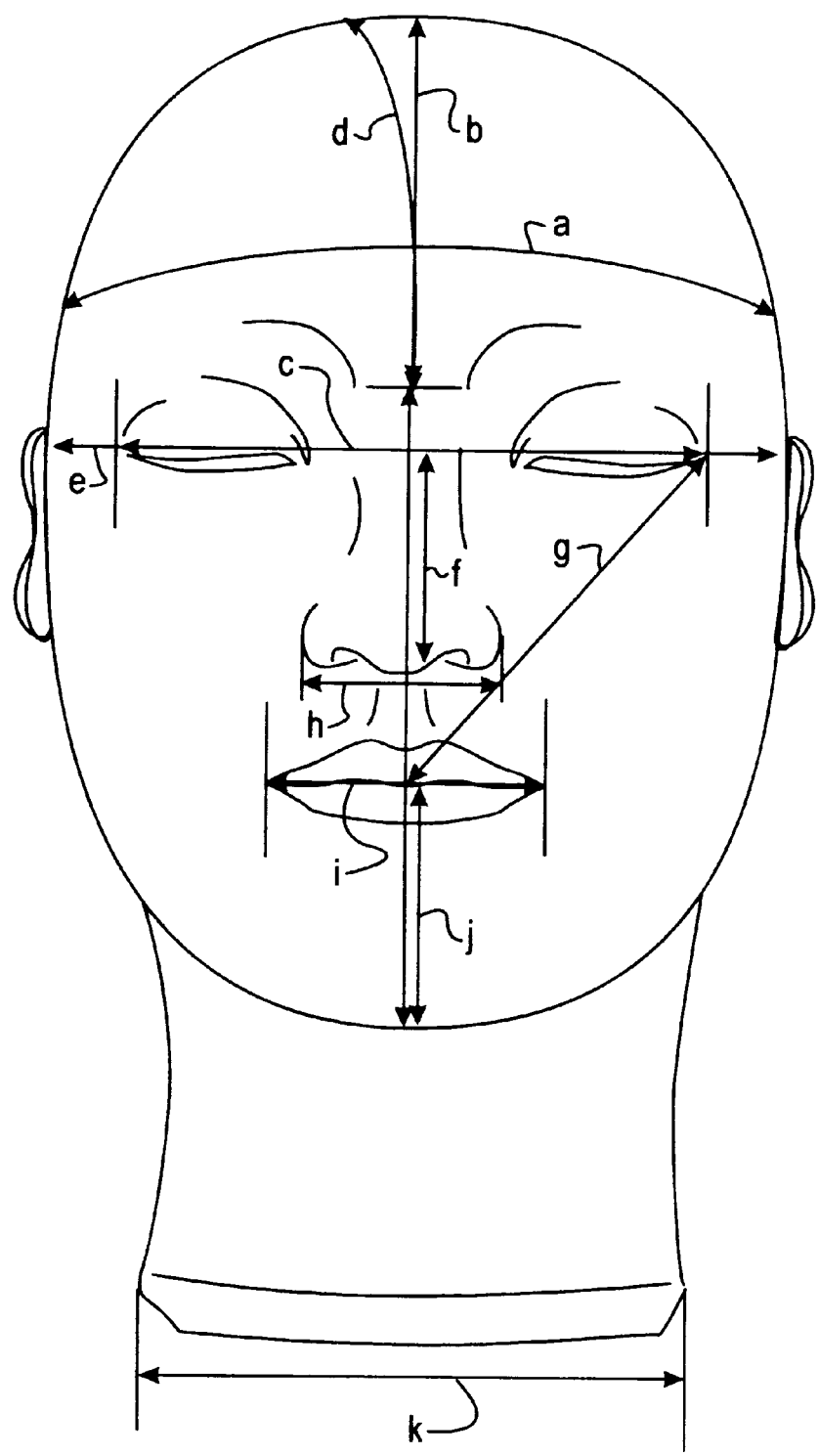
FIG. 13A is a front elevational view of the preferred embodiment of the make-up mannequin head of the invention provided with the "perfect" oval facial configuration and illustrating the facial measurement data of the facial components thereof.
Figure 13B:
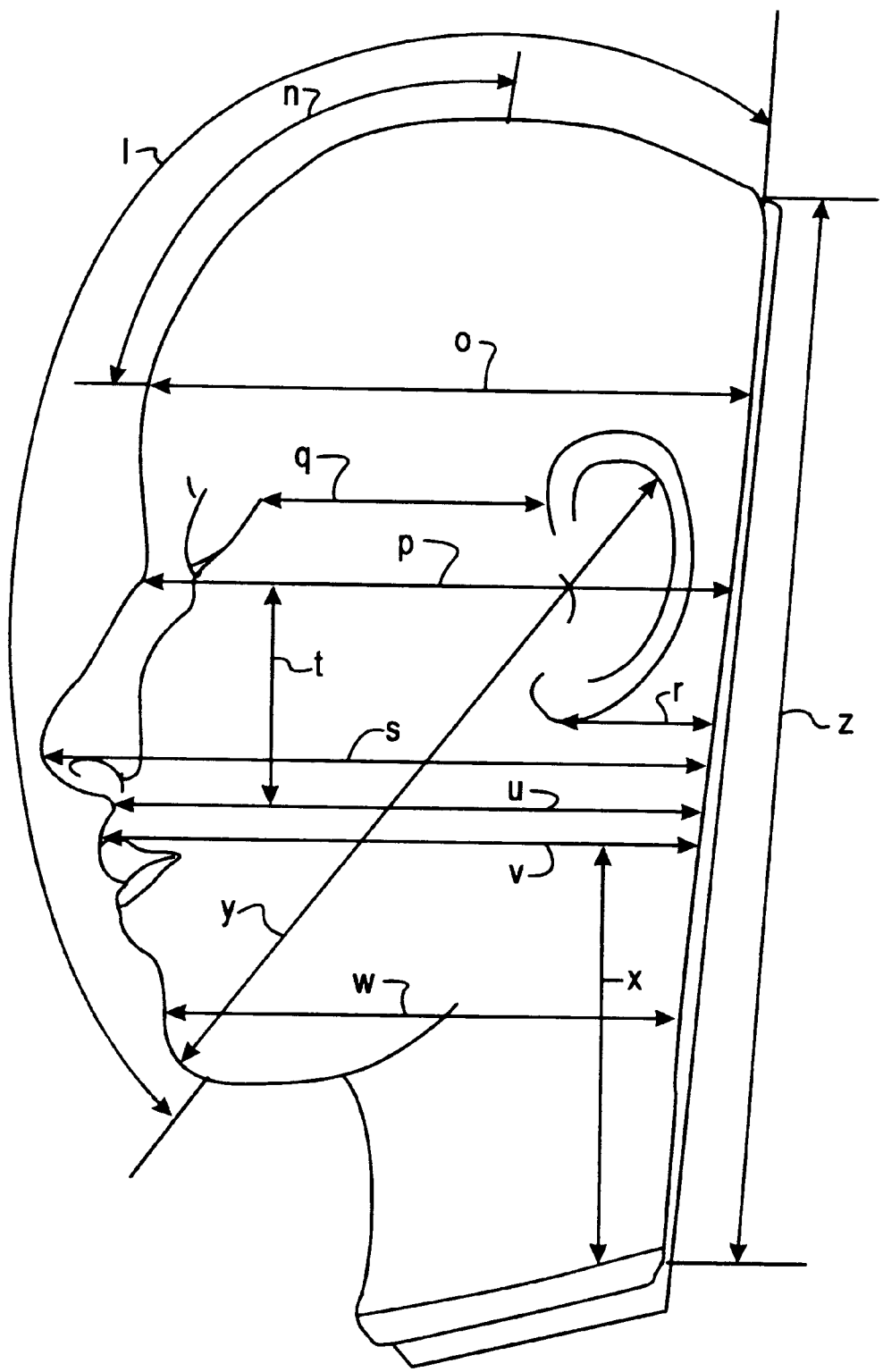
FIG. 13B is a side elevational view of the preferred embodiment of the make-up mannequin head of the invention provided with the "perfect" facial configuration the invention and illustrating the measurement data of the facial components thereof.
Figure 14A:
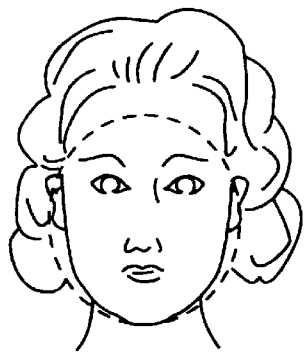
FIG. 14A–14G, 14I and 14J illustrate representations of representing eight of the classic facial configurations and, as well, the "perfect" or "ideal" facial configuration of the make-up mannequin head according to the invention, the said make-up mannequin facial configuration being capable of formed selectively to any appear as selected ones of the classic facial configurations solely by means of artistic application only of cosmetic compositions to the selected ones of the companion masks.
Figure 14B:
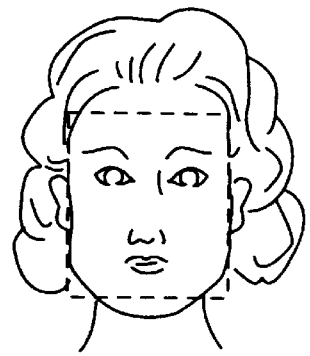
Figure 14I:
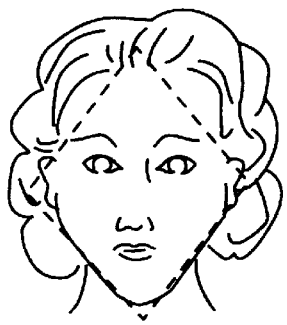
Figure 14C:
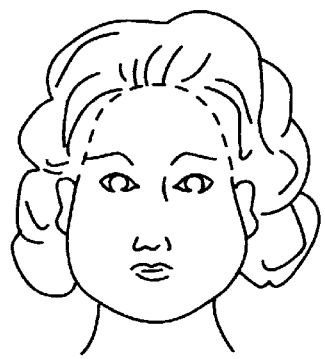
Figure 14D:
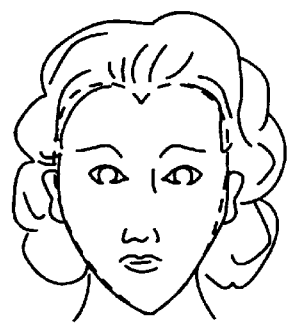
Figure 14J:
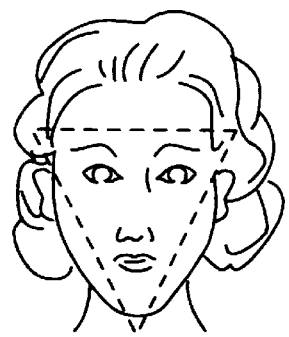
Figure 14E:
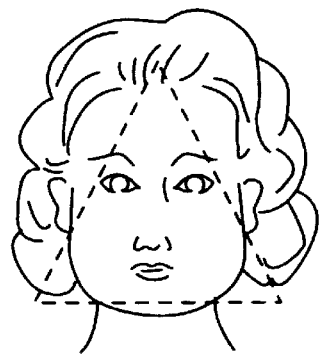
Figure 14F:
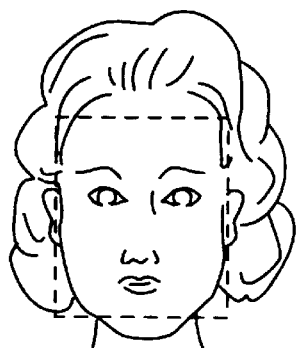
Figure 14G:
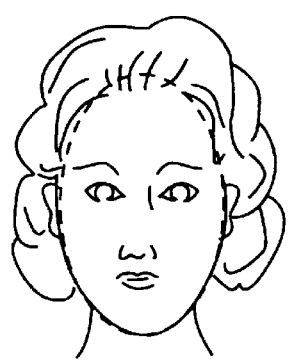

| FIG. 13A | |
|---|---|
| line a = distance across the forehead from back to back | 13.0" |
| line b = distance along the center line from the back to the chin | 12.25" |

TABLE I-continued

FIG. 13A

| | | |
|---|---|---|
| line c = | distance across the eye formation from the left corner of the left eye to the right corner of the right eye | 4.0" |
| line d = | distance from the back to the brow | 7.50" |
| line e = | distance between the left corner | 2.50" |
| line f = | distance from the bridge of the nose to the bulb of the nose | 2.0" |
| line g = | distance from the right corner of the right eye to the center of the mouth | 3.0" |
| line h = | distance along the base of the nose | 1 3/8" |
| line i = | distance across the mouth from end to end | 2.25" |
| line j = | distance from the center of the mouth to the chin | 1.5" |
| line k = | distance across the throat from from back to back | 6.25" |

TABLE II

FIG. 13B

| | | |
|---|---|---|
| line l = | distance from the top edge of the mounted mask to the base of the the chin of the mounted mask | 10.5 |
| line m = | distance from the top edge of the of the mounted mask to the center of the brow | 12.25 |
| line n = | distance from the center of the of the brow of the mounted mask to the center of the head of the mounted mask | 3.5" |
| line o = | distance from center of the forebrow of the mounted mask to the rear edge of the mounted mask | 6.25 |
| line p = | distance from center of the bridge of the mounted mask to the rear edge of the mounted mask | 6.50 |
| line q = | distance from the right end of the right eye of the mounted mask to the right ear of the mounted mask | 2.50 |
| line r = | distance from the lobe of the right ear of the mounted mask to the edge of the mounted mask | 1.75" |
| line s = | distance from the tip of the nose to the edge of the mounted mask | 6.50" |
| line t = | distance from the bridge of the nose of the mounted mask to the base of the nose of the mounted mask | 2.0" |
| line u = | distance from the base of the nose to the edge of the mounted mask | 6.0" |
| line v = | distance from the upper lip of the mounted mask to the edge of the mounted mask | 5.75" |
| line w = | distance from the chin of the mounted mask to the edge of the mounted mask | 5.0 |
| line x = | distance from the right jaw of the mounted mask to the edge of the neck of the mounted mask | 3.0" |
| line y = | distance from the center of the chin of the mounted mask to the upper rear edge of the right ear of the mounted mask | 6.0" |
| line z = | distance from the top of the flat back of the make-up mannequin head mounting the mounted mask to the bottom edge of the base of the of the base. | 10.00" |

Figure 6:
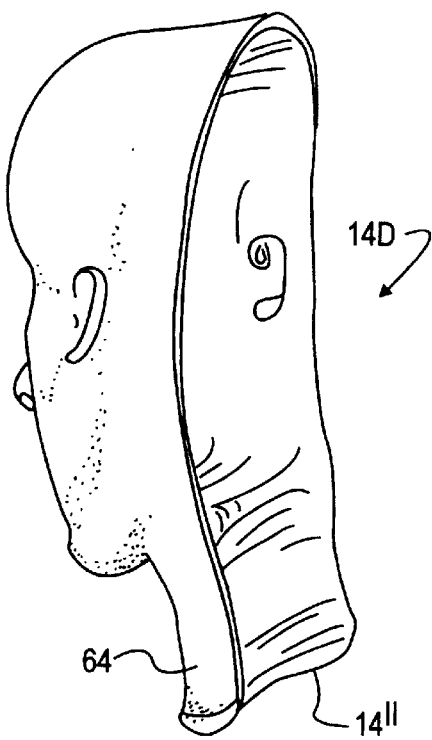
FIG. 6 is an elevational rear perspective view of one of the flexible resilient elasticized companion masks illustrated as one of the components of the make-up mannequin kit shown in FIG. 1.

As illustrated in FIGS. 1, 4, and 6, each of the companion masks 14A, 14B, 14C and 14D may include a bent grasping portion 14" unitary with the terminal portion of the neck formation 64 which grasping portion 14" provides the trainee (student) with a purchase upon which to pull the resilient elastic stretchable companion mask over the make-up mannequin head 12 so that the mask is fitted snug onto the facial configuration of said make-up mannequin head 12, including over the edges of the base or neck 64 snugly engaged over the edge of the neck formation 64 of make-up mannequin head 12.

Figure 8:
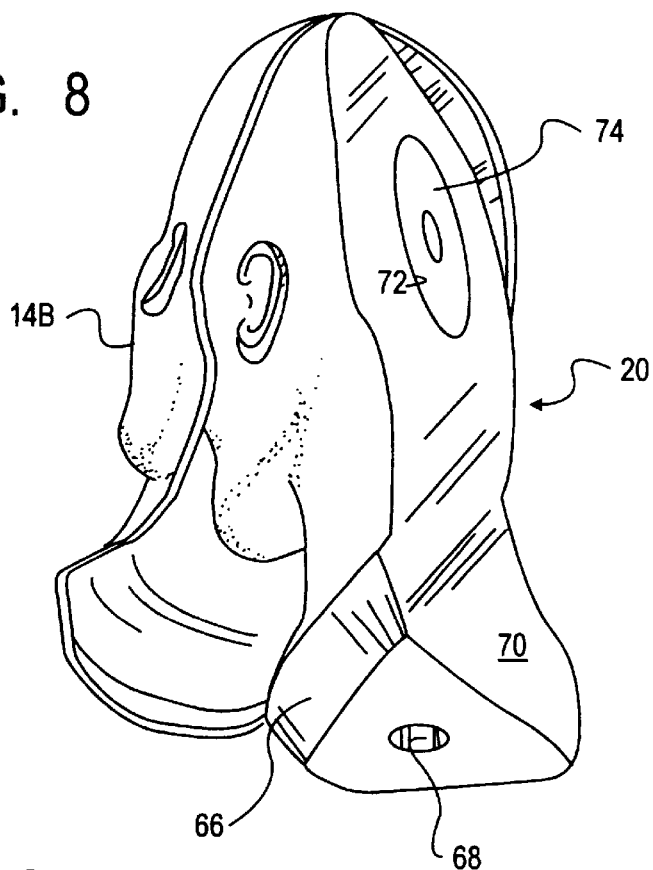
FIG. 8 is a perspective elevational generally rear view of the soft-skin make-up mannequin head illustrated in FIG. 4 and showing one of the flexible soft-skin resilient companion masks of FIG. 1 in the process of being mounted to said make-up mannequin head.
Figure 9:
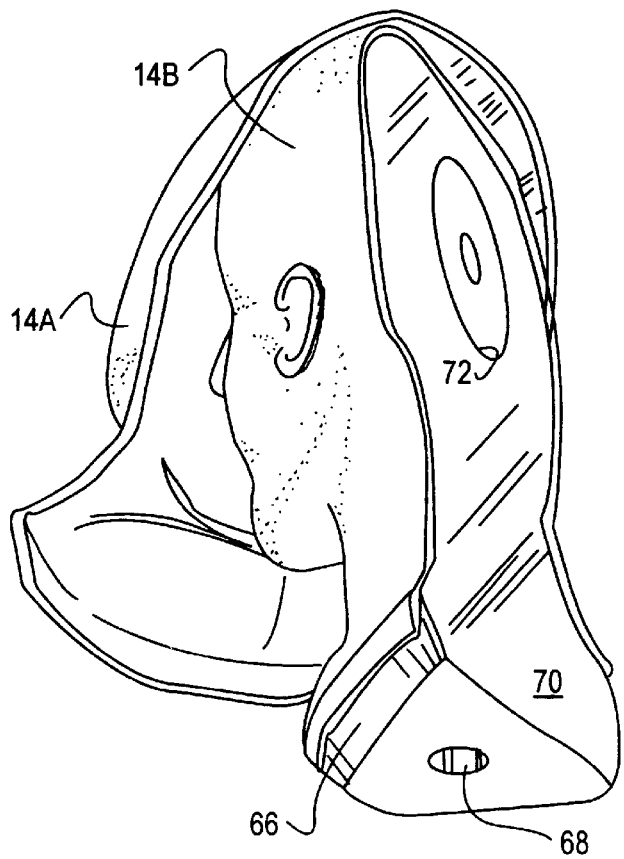
FIG. 9 is a elevational generally rear perspective view of the soft-skin make-up mannequin head illustrated in FIG. 5, shown with one of the flexible resilient companion masks of FIG. 1 mounted to said soft-skin make-up mannequin head and another of said soft-skin flexible resilient companion masks depicted in the process of being mounted upon said premounted companion mask carried by said soft-skin make-up mannequin head.

As shown in FIGS. 8 and 9, in view of the elasticity and stretchability of the companion masks 14, one companion mask can be stretched to fit over another companion mask which may have been earlier mounted to the make-up mannequin head and return back to effect a fit upon the earlier mounted companion mask. The elasticity and stretchability of each of the different colored masks enables the mounting of additional ones of the remaining masks one upon the other previously mounted mask or masks already mounted on the make-up mannequin 12, as shown in FIG. 4. This enables the make-up mannequin head 12 with the respective masks mounted one on the others to be carried conveniently within in a suitable carrier (not illustrated) for the complete make-up mannequin kit 10 so that the trainee (student) can bring the complete make-up kit to a portable state. This permits the trainee (student) to take the make-up mannequin kit 10 along with him or her so that learning and practice can be carried out at a location outside the school practice room, say the trainee's (student's) home, for example. Additionally, such portabiliity permits the cosmetic sales person and/or demonstrator to bring the entire kit, as a package, with him or her to the site of the demonstration without requiring carrying a large, relatively unwieldly conventional demonstrator equipment. For the point of sale demonstrator, all the necessary demonstration equipment occupies little space along with the convenience of all members required being at hand at the point of sale . . . i.e. demonstration.

The availability of the elastic, resilient masks, each of which carries the skin-tone and color representative of a specific skin-tone and color matching most of the human racial features, enables the user to gain experience and to demonstrate to clients or others covering most human racial features. Since clients and future clients of the commercial demonstrators, cosmetic practitioners, cosmetologists, trainees and students will be persons of different racial identity and/or ethnicity with a variety of different skin-tones and/or color, experience is gained during the training with use of the make-up mannequin and make-up mannequin kit of the invention, enabling providing benefit to any kind of skin-tone or color human person by placing the selected mask from the make-up mannequin kit 10 over the basic make-up mannequin head component thereof.

As referenced above, the make-up mannequin kit 10 according to the invention is advantageous in that demonstration, training and practice is available for schooling and training in the techniques of the recently popular permanent make-up or tattoo on human eyebrows, eyelashes and lips. Using the components of the make-up mannequin kit 10 of the invention, the trainee (student) also can learn and practice the technique of application of permanent make-up by using the tattoo needle with ink applying on the selected mask, normally upon the Caucasian or light colored (white or near white) companion mask. The availability of the make-up mannequin kit 10 is particularly beneficial for the teaching and practice of the art of permanent make-up application which amounts to a form of tattoo practice in that the human client cannot afford to have mistakes applied on them by non-skilled, poorly trained make-up cosmologists or make-up artists. Once the permanent make-up is applied, there is no other way to erase such application except for the client to undergo painful medical procedures. With the use of the make-up mannequin kit components, if a trainee, student, practitioner or cosmologist makes a mistake on one of the masks 14, he or she can keep practicing until it is right. When there is no more area in the mask for them to practice. A new mask is selected and placed on the make-up mannequin for the new exercise for further permanent make-up training. As mentioned above, the various available skin-tone companion masks are less important than in the training of individuals in the art of permanent make-up technique, i.e. tattooing, but the available different color make-up mannequin companion masks according to the invention provide the realistic human facial features, the eyebrow templates, the table clamp holding the make-up mannequin head upward to enable realistic training for the make-up students to practice their work for achieving improved skill before application on real human faces.

The make-up mannequin head and companion masks are easy to use. A wet paper towel or cloth is employed to clean the facial configuration of the mannequin head. Likewise, when the companion mask 14 to be used is selected and mounted upon the make-up mannequin head 12, a small portion of the cleansing cream is applied to the surface of the facial configuration thereof in the area where make-up is to be applied, the cream being distributed evenly. The particular make-up to be applied is selected and applied to the cleaned area. Upon completion or when desired, the applied make-up is removed from the surface by using a paper towel or cloth with a zig-zag motion, until the make-up is completely removed. When using a mask formed of polyvinyl chloride, there may remain a minor and hardly visible residual amount of the make-up remaining upon the surface of the companion mask. When using a silicone mask, no residual make-up remains as silicone is not porous. The surface area must be cleaned after every application of make-up. Since the porosity of the PVC mask is practically invisible to the human eye, the cleansing cream application need only be made once in the beginning of a series of make-up application.

Directing attention to FIGS. 15A to 15E, five sets of commonly encountered eye formations are illustrated along with relatively matching illustrations FIGS. 15A–15E showing one eye, the right eye as viewed, of the eye formations respectively of said eye formations 15A–15E to illustrate; the manner taught to the student or trainee how to utilize the three conventional types of eye-shadow in treating the respective eye to accentuate those shapes. There are five different eyeshapes illustrated, namely, the oriental shape shown in FIG. 15A, the natural nature wide set eye formation shown in FIG. 15B, the deep set eye formation shown in FIG. 15C, the deep set eye formation shown in FIG. 15D, the closed set eye formation shown in FIG. 17D and the basic bulging eye formation shown in FIG. 15E. The eye formation carried by the companion mask members can be utilized to teach and practice the use of different shading compositions selected and employed to illustrate the application of eye shadow to alter or to reinforce the use of an eye shadow composition to selectively emphasize the training and practice of applying eye shadow cosmetic make-up of the three conventional shades respectively to the masks, to enable the trainee to treat the various different eye formations encountered. These types of eye shadow 76 comprise the range, light eye shadow, medium dark eye shadow 80 and very dark eye shadow 78.

FIGS. 15A'–15E' illustrate the method of applying three different shades of eye shadow to the eye formations of FIGS. 15A–15E, only one eye, the right eye as viewed, being shown in said FIGS. 15A'–15E'.

FIG. 15E presents the oriental eye formation of FIG. 15A for which the light eye shadow 76 is applied at a location across the upper eye lid extending close to the bridge 41 of the nose 42. Then, the very dark eye shadow 78 is applied along a line extending across the eye lid extending along the eye lid in a line following the eye socket. The remainder of the eye lid receives an application of medium dark eye shadow 80 there across.

FIG. 15B' presents of the natural mature wide-set eye formation of FIG. 15B for which the light eye shadow 76 is applied to the eye lid along the area adjacent to the eye brow with dark eye shadow 78 being applied to right corner of the illustrated eye lid while the medium density eye shadow 80 is applied to the remainder of the eye lid of the companion mask 15B' to result in the treatment applied to the companion mask 12 to give training to the trainee so as to result in the mature appearance.

In FIG. 15C', the deep-set eye formation of FIG. 15C is shown as the desired result of application of the shades of eye shadow to the eye formation of the companion mannequin mask to result in the deep-set appearance. Instead of using a substantial coverage of the eye lid, a medium density eye shadow 80 is applied to the upper right corner of the eye lid along the area thereof closely adjacent the right inner portion of the eye lid including a portion near the bridge 41 of the nose 42. Dark eye shadow 78 is applied to the right corner of the eye lid and along the area at the bridge 41 of the nose 42. The remainder of the eye lid is treated with light eye shadow 76.

FIG. 15D' illustrates the close-set eye formation of FIG. 15D on which medium eye shadow 80 is applied at the upper portion of the eye formation, the light shadow 76 and the dark density eye shadow 78 is applied upon the inner half of the eye lid to reach the right corner of said eye lid closely adjacent the bridge 41 of the nose. The remaining half of the eye lid receives the light shadow to the left area of the eye lid to result in the close set eye formation.

FIG. 15E illustrates the basic bulging eye formation of FIG. 15E which receives the application of light eye shadow 76 along the upper area of the eye socket to the upper right hand corner of the right hand portion of the eye lid extending to the right side of the bridge 41 of the nose. The dark eye shadow 78 is applied below the area occupied by the light eye shadow 76 and extends from the left corner of the bridge of the nose below the light eye shadow partially along the left eye socket from the bridge of the nose. The remainder of the eye lid receives coverage of a medium density shadow 80.

Figure 16A:
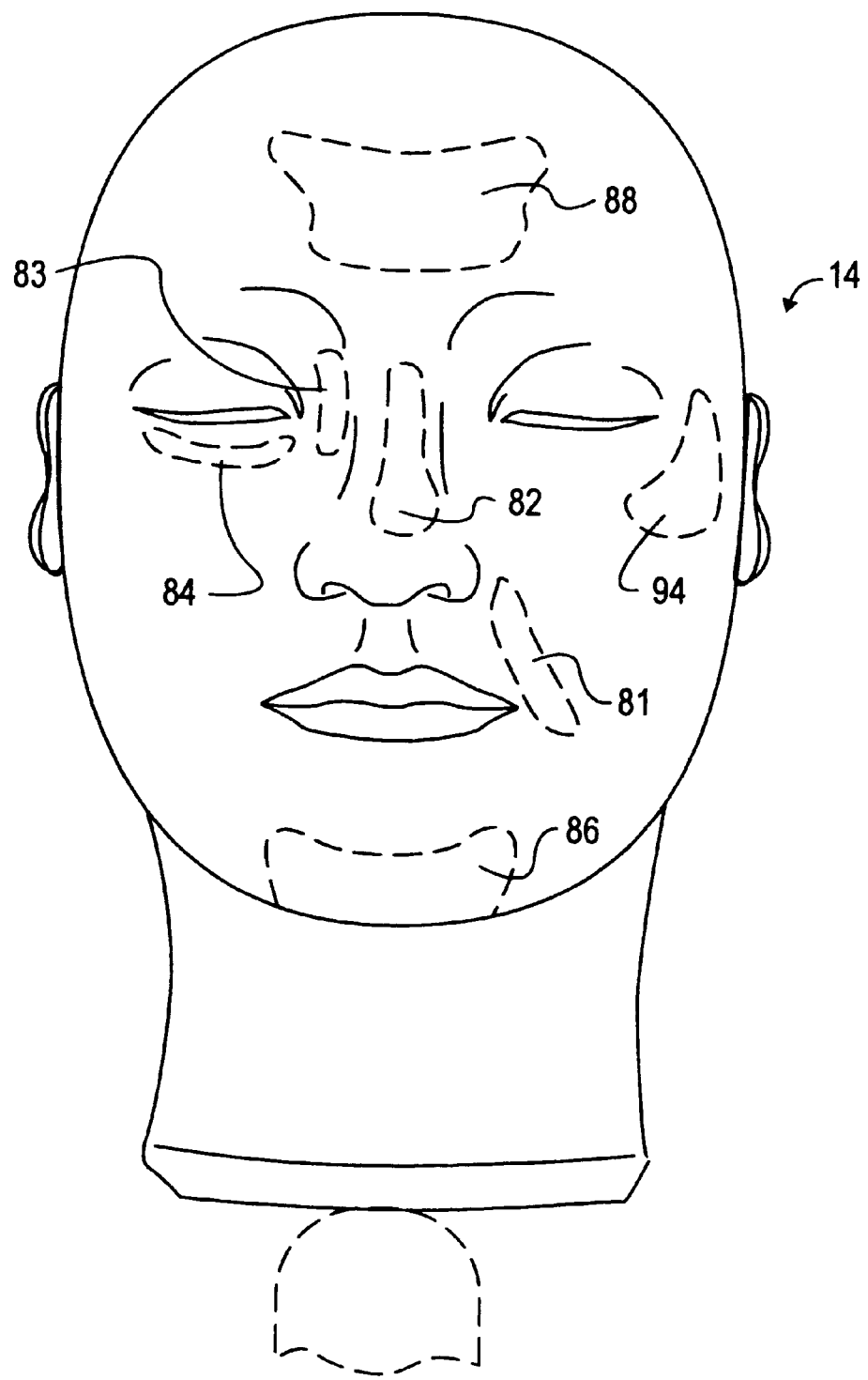
FIG. 16A is a graphic representation illustrating the use in training of selected cosmetic compositions such as dark foundation, eye disguise or highlighter applied to the make-up mannequin according to the invention to improve the appearance of certain facial features at locations ilustrated and using the make-up mannequin kit according to the invention for teaching and practice of the application of such compositions by the cosmetitian trainee or student.

As discussed heretofore, the make-up mannequin kit of the invention is particularly useful in the teaching and training of cosmetitian trainees in the art of using cosmetic preparations to improve the appearance of the facial configurations of clients. FIG. 16A illustrates the application of cosmetic preparations such as light foundation creme, eye disguise and/or highlighter to a selected ones of the companion masks 14 so as to effect an improvement of the facial appearance, reducing the effect of various encountered areas on the facial configuration which are improved. A mask member 14 is illustrated having various areas of improvement to which the application of light foundation creme, eye disguise, highlighter, concealer or blush will result in a change in the light reflection angle so as to change the visible impression to the viewer. In this way, an illusion is created reducing the viewer's recognition of the undesired feature. Application of shadow at the cheek areas 81 of the mask as shown in FIG. 16A will cause the viewer to see the visage or facial configuration as thinner than its physical reality. Likewise, a thick or wide nose can be made to appear thinner to the viewer by application of a light reflective foundation creme to the sides of the nose bridge at area 82 of the mask as shown in FIG. 16A. The visual effect of deep-set eyes can be disguised by application of light foundation or eye disguise to the area 83 at the bridge of the nose between the inner right hand corner of the right eye as shown in FIG. 16A to the degree that the reflection of light is changed. The appearance of dark circles under the eyes can be ameliorated by applying concealer instead of highlighter at area 84 of the mask as shown in FIG. 16A. Light foundation can be applied at area 86 of the companion mask 16 as shown in FIG. 16A which application changes the reflection of light thereat to reduce the visible appearance of a receding chin. The appearance of a low forehead can be modified by application of light foundation creme at area 88 of the companion mask 14 as shown in FIG. 16A. Area 94 of the companion mask 14 illustrated in FIG. 16A is receptive of application of light foundation creme to reduce the visual effect of a long face.

Figure 16B:
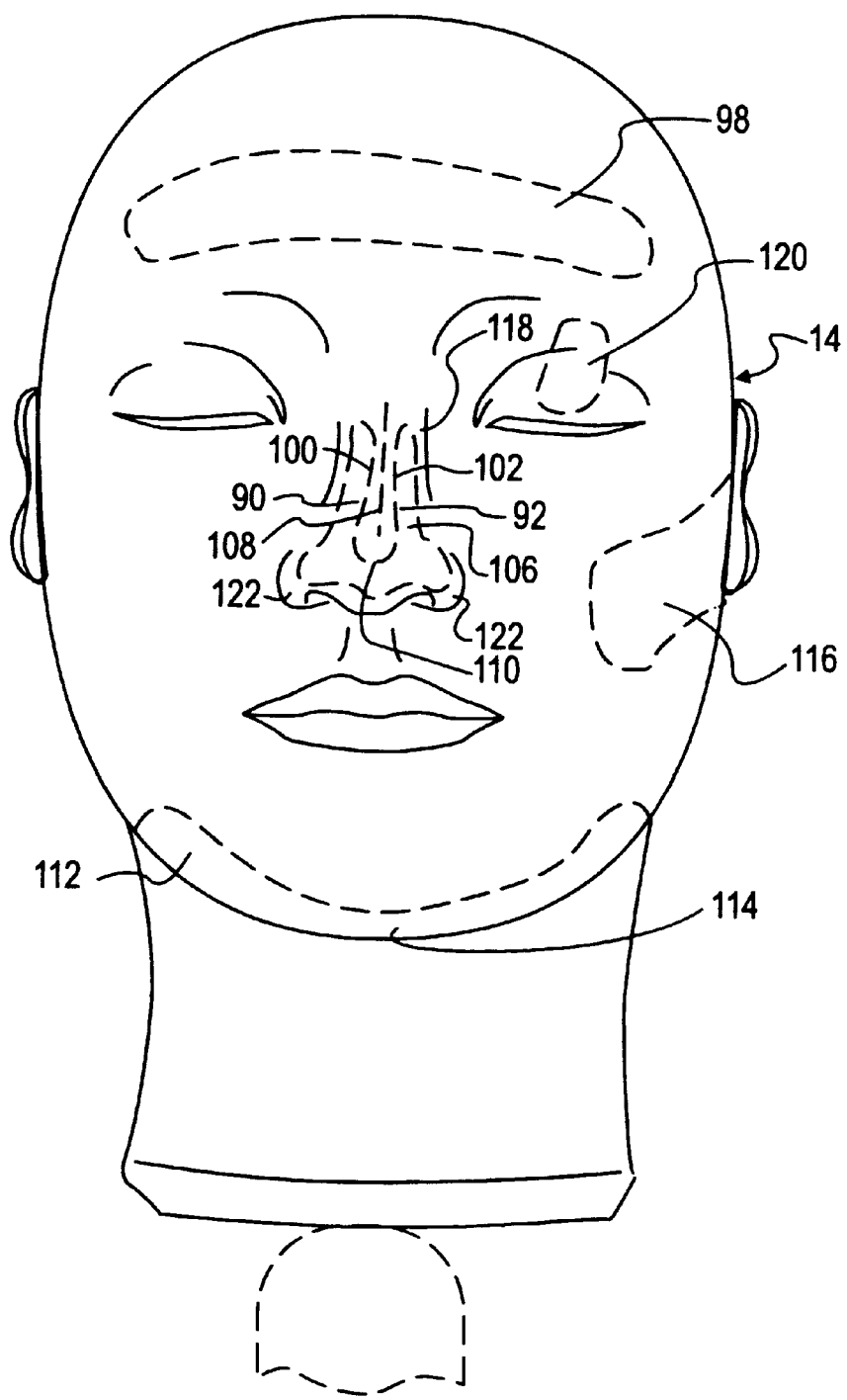
FIG. 16B is a graphic representation illustrating the use in training of selected cosmetic compositions such as dark foundation or eye disguise applied to the soft-skin mannequin head according to the invention to or adjust conceal the visual appearance selected defective facial features and using the make-up mannequin kit of the invention for the teaching of and practice by cosmetitian trainees and students.

FIG. 16B illustrates the areas of the mounted mask to which dark foundation or eye disguise can be applied to conceal or reduce the appearance of certain perhaps objectionable characteristics of the facial configuration. The appearance of a long nose can be disguised by application of dark foundation or shadow along both sides of the nose at areas 90 and 92 of the facial configuration of the mask 14 as shown in FIG. 16B. The appearance of a protruding forehead can be disguised by applying dark foundation to the area 98 of the mask 14 as shown in FIG. 16B. If the undesired appearance of a large nose is to be reduced, application of dark foundation at area 100 of the companion mask shown in FIG. 16B effects contouring the center of the nose. The trainee can be taught and can practice the techniques to disguise or conceal the appearance of a wide nose by contouring along both sides of the nose at areas 90 and 92 of the companion mask 14 shown in FIG. 16B. A hooked nose can be disguised by contouring the protruding bone by contouring the area 102 of the protruding bone of the companion mask 14 shown in FIG. 16B. A crooked nose can be made to appear straight by contouring the crooked side along area 106 with dark foundation and highlighting the center line 108, stopping at the bulb 110 at the end of the nose of the companion mask 14 as shown in FIG. 16B. The appearance of a double chin can be corrected by contouring the entire length of the chin at area 112 of the companion mask 14 with dark foundation or eye disguise while the appearance of a long chin can be improved by applying dark foundation by contouring the area 114 at the center only of the chin of the companion mask 14 as shown in FIG. 16B. Likewise, a square prominent chin can be reduced in appearance in the same manner as the double chin is minimized. The appearance of large jaws can be reduced by applying can be concealed by application of dark foundation or eye disguise along area 116 at the upper cheek of the companion mask in the vicinity between the right eye and the lower portion of the ear in FIG. 16B. A wide nose requires application of dark foundation creme or eye disguise contouring both sides of the nose at areas 118 as shown in FIG. 16B. The appearance of heavily lidded eyes can be ameliorated by application of dark foundation or eye disguise at area 120 of the companion mask shown in FIG. 16B. Area 122 of the companion mask 14 illustrated in FIG. 16A is receptive of application of light foundation creme to reduce the visual effect of a long face. A long nose requires application of dark foundation at areas 122 as shown in FIG. 16B contouring the base of the nose and the tip thereof as carried by the companion mask 14.

The above discussion is intended to illustrate the operation of the masks 14 of the make-up mannequin masks of the invention as intended for use by trainees or students of cosmetology in the course of their studies in beauty schools and the like. As mentioned earlier, the trainee or student user of the make-up mannequin kit has, in a portable carrier, the full complement of make-up mannequin, masks of selective different color, materials and tools, providing portability enabling the trainee or student to learn and practice both in the school and at home or other location outside the school area. Not only do the trainee or student have access to the required tools anywhere, but also, with the soft-skin make-up mannequin and plural soft-skin masks of the varied different ethnic colors to select, the soft-skin mannequin enables the trainee, student or other user of the kit to learn and practice the art of facial massage due to the softness and flexibility of the surface and texture of the material.

With reference to FIG. 17 of the drawings, little has been discussed with reference to the techniques of implementing the art of permanent make-up application, i.e. by effecting the art of tattoo, long known and practiced, but more recently having become quite popular among various segments of the population. Tattoo is an ancient art practiced over the centuries throughout the world. It can be effected by use of surgical needles carrying colored dyes or pigments which are manipulated by practioners upon the human and animal skin. Generally used to apply artistic indicia in complex or simple patterns, its use in applying permanent make-up such as permanent eyebrow reproductions, lip lines and, to some extent, eye-lines as eye-liners. Training in this permanent make-up techniques have been carried out by practice upon leather materials. The make-up mannequin kit of the invention includes masks of the different skin colors which are formed of polyvinyl plastic material which are porous with fine holes practically invisible to the naked eye. These masks are fitted over the make-up mannequin of the invention and can be employed by trainees and students learning the art of permanent make-up application by tattoo technique. Obviously, the individual masks used for such tattoo technique implementation have a limited useful life and can be discarded when no longer useful . . . carrying too many punctures. However, these masks provide a realistic and practical, human simulative unit with a human-like appearance and skin surface, and are, as such, of substantial use both physically and economically, as well as enabling training and practice with units simulative in sight and touch, to human clients, as well as preventing harm to actual living subjects. Once applied to a human, tattoo is permanent and difficult as well as painful to remove. The trainee or student, or even the professional cosmetitian, requires adequate training and practice if they are to practice this art professionally. The make-up mannequin and the mannequin kit of the invention provide a safe means to effect the training of permanent make-up practitioners.

In FIG. 17A–17I, there are shown plural representations of likely lip formations—than is lip line formations—representative of the lip lines to be applied by the art of permanent make-up, that is by tattoo technique. In the FIGURES set forth, FIG. 17A illustrates a lip formation where both upper and lower lips are thin; FIG. 17B illustrates a lip line formation comprising a thin upper lip compared to a thick lower lip; FIG. 17C illustrates a lip line formation comprising a relatively thin upper lip line is combined with a thicker lower lip line. FIG. 17D illustrates a small line mouth with the lower lip line is thicker than the upper lip line. FIG. 17E illustrates a lip formation having an arrow bow configured upper lip line and the lower lip is thicker than the upper lip. However, the lip line of the pair shown in this FIGURE droops at its ends, particularly the lower lip line droops.

FIG. 17F provides an outline of an eye formation wherein the lip outlines comprise a large full centered pair of lips with tight corners where as FIG. 17G illustrates lip outlines which illustrates a small full centered pair of upper and lower lip outlines. FIG. 17H illustrates lip outlines representing a small, uneven pair of upper and lower lips, the upper lip outline being arrow bowed and the lower lip outline being substantially thicker than the upper lip outline.

FIG. 17I illustrates a lip line formation where the upper lip is thin and uneven as well as arrow bowed, the lower lip outline also is thicker than the lower lip outline but is not as sharply bowed as the lower lip outline shown in FIG. 17H.

Each of the lip line formations can be effected by tattoo technique upon the lip formation provided on the companion masks to the make-up mannequin intended for use in teaching and practice of permanent make-up techniques, namely by tattoo. They can be applied preferably using the PVC masks and also can be applied using the alternate silicone masks although due to the expense of the silicone masks, the latter are not likely to be selected for such tattoo technique.

The eye brow stencil templates illustrated in FIG. 11 are utilized in teaching the permanent (tattoo) technique as applied to permanent application of eye brow formations. The trainees can follow the guide line following the edge of the eyebrow cut-outs 11' carried by the respective of the stencil templates illustrated in FIGS. 11A, 11B, 11C and 11D, respectively the common arch eyebrow template 11A', the straight eyebrow template, the straight eyebrow template 11'B, the corner arch eybrow template 11'C and the natural arch eyebrow template 11'D. The user can select which of the aforementioned eye-brow formations to be employed in effecting the tattoo application upon the companion masks 14.

There has been described a make-up mannekin kit which comprises a collection of multiple units gathered and offered together as a teaching aid in the instruction and training of cosmetitians, the kit being anchored by provision of a soft skin make-up mannequin head having what can be called a "perfect" facial configuration and body structure suitable for each trainee or student to possess, receive expert instruction and engage in practice either in the school and/or at home or other location outside the school. Included in the make-up mannequin kit of the invention are soft skin, elasticized, stretchable companion masks having the identical facial configuration as that of the make-up mannequin head. These masks are provided having different skin tones and colors for use to permit simulation of the different encountered ethnic and racial origin of likely human clients enabling the trainee or student, as well as practicing professionals to gain experience in effecting cosmetic applications to the different and varied population comprising clients and clients to be. These companion masks can be selectively mounted tightly upon the make-up mannequin head of the kit and can be a boon to both the beauty culture schools as well as their students and trainees. Further, the nature of the make-up mannequin and their companion masks can be economically beneficial in reducing the costs of operation of these training institutions and the trainees and students attending them by eliminating the need for living models, for pooling of objects to be handled by the trainees and students, by permitting practice by the trainees or students outside the school, at home or other locations, by simplifying the instruction received though hands-on experience. In addition, the kit includes the other components required in the instruction, all in one package, the package being light weight and portable. Every implement needed by the teacher, the trainee and the student is at hand.

The skilled artisan may be able to make changes and modification in the invention as described herein without departing from the scope of the invention as claimed. It should be understood that changes in the material from which the make-up mannequin head and the companion masks are formed can be made providing the soft touch, flexible, resilient surface characteristics and stretchable characteristics remain. Selective variations in dimensions and facial configuration of the make-up mannequin head may be made within the scope of the invention, particularly so long as the symmetry and general shape of the facial configuration remains. Substitution of particular components, deletion of specific components or inclusion of additional components for those in the mannequin kit or changes in the measurements disclosed herein can be made without departing from the spirit and scope of the invention as claimed.

I claim:

1. A cosmetology teaching, training and practice system comprising a soft skin makeup mannequin having a body having an oval symmetrical facial configuration formed thereon and plural flexible, elastic, resilient and stretchable companion mask members, each of said companion mask members formed as a shell open at one side thereof and being of the size and shape conforming to the size and shape of at least the facial configuration portion of the make-up mannequin head and having a facial configuration identical to the facial configuration of said make-up mannequin, each of said companion mask members having a soft skin surface having a skin tone and color representative of at least one of plural human racial and ethnic origin, said companion mask member being stretchable to be mounted upon the facial portion of said body and elastically resilient to assume return secure engagement with the facial configuration of said mannequin head, said surface of said make-up mannequin head and companion masks capable of receiving and temporarily retaining cosmetic compositions thereon at selected locations upon the facial configuration carried thereby.

2. The system according to claim 1 in which said plural companion masks have different skin tones and colors respectively representative of different human ethnic and racial origin.

3. The system according to claim 1 in which said companion masks are self-adhered to the make-up mannequin head after mounting thereupon and being removable therefrom.

4. The system according to claim 1 in which said make-up mannequin head body is solid and comprises an outer hollow shell carrying said surface and a foamed-in inner filling, said body having a flat back surface portion and a base, said base having means for mounting said make-up mannequin head in make-up receiving orientation.

5. The system according to claim 4 in which said back surface has an elevated portion integral therewith at an end portion thereof whereby upon disposition with said back surface positioned horizontally, the make-up mannequin head assumes an attitude with the facial configuration thereof directed angularly upward.

6. The system according to claim 4 in which passage means are formed in said base opening exterior thereof and adjustable stand means including support means receivable within said base opening supporting said make-up mannequin oriented vertically.

7. The system according to claim 1 in which said surface of said make-up mannequin head and said companion masks are finely porous.

8. The system according to claim 1 in which said surface of said mannequin head and said companion masks are impervious to passage of cosmetic compositions therethrough.

9. A make-up mannequin kit comprising:
   a soft-skin make-up mannequin head having a body carrying an oval symmetrical facial configuration,
   plural flexible, elastic, resilient and stretchable companion mask members, each of said companion mask members formed as a shell open at one side thereof and being of size and shape conforming to the size and shape at least of the facial portion of said make-up mannequin head and having a facial configuration identical to the facial configuration of said make-up mannequin head, each of said plural companion mask members having a soft skin surface of skin tone and color of one of plural human skin tones and colors representative of different surface skin tone and color of ones of plural human ethnic and racial origin, each of said companion masks being elastic and stretchable sufficient for mounting upon said make-up mannequin head and resilient so as to spring back tightly to engage the surface of the facial configuration of said make-up mannequin head when mounted thereto and being selectively removable therefrom;

plural cosmetic compositions for selective application to the facial configuration of said make-up mannequin head and selected ones of said companion masks mounted thereon;

plural applicator members suitable for applying said selected ones of said cosmetic compositions to said facial configuration of said make-up mannequin head and of said selected ones of said companion masks mounted thereupon; and, guide members for aiding the operator in the selection of the locations on said make-up mannequin head and companion mask mounted thereupon suitable for receiving selected ones of said cosmetic compositions and providing guidance in effecting desired patterns upon said facial configurations.

10. The make-up mannequin kit according to claim 9 including textual carrying means for instructing the operator in the techniques of application and use of said cosmetic compositions.

11. The make-up mannequin kit according to claim 9 including portable carrier means for holding and transporting the components of said make-up mannequin kit as a unit.

12. The make-up mannequin kit according to claim 9 wherein said guide means include stencil templates having detail configurations of selected outlines for tracing cosmetic application areas on said facial configurations of said make-up mannequin and the associated companion masks mounted thereon.

13. The make-up mannequin kit according to claim 10 in which said make-up mannequin head body is solid and formed of an outer shell carrying said facial configuration and a foamed-in interior filling.

14. The make-up mannequin kit according to claim 13 in which said body has a flat back surface with an elevated portion and a base, said back surface having an elevated portion integral therewith at an end portion thereof opposite from said base whereby upon disposition thereof in a horizontal plane, the make-up mannequin head assumes an attitude with the facial configuration thereof directed angularly upward.

15. The make-up mannequin kit according to claim 13 in which passage means are formed in said base opening exterior thereof and adjustable stand means including support means receivable within said base opening capable of supporting said make-up mannequin head oriented vertically.

16. The make-up mannequin kit according to claim 13 and said adjustable stand means being capable of orienting said make-up mannequin oriented vertically in an angular path of 360 degrees.

17. The make-up mannequin kit according to claim 9 including needles and inks and related compositions suitable for permanent make-up application according to tattoo techniques.

18. In combination, a cosmetology teaching aid comprising a soft skin make-up mannequin head having a body, said body having an oval symmetrical facial configuration; and plural flexible, elastic, stretchable and resilient companion mask members, each of said companion mask members formed as a shell open at one side thereof and being of a size and shape conforming to the size and shape of the facial portion of said body and having a facial configuration identical to the facial configuration of said make-up mannequin, each of said companion mask members having a soft skin surface of skin tone and color representative of selected ones of plural ethnic and racial origin, each companion mask member being stretchable to be mounted upon the facial portion of said body and elastically resilient to assume return secure engagement with the racial configuration of said make-up mannequin head, said surface of said make-up mannequin head and companion masks being capable of receiving and temporarily retaining cosmetic compositions thereon at selected locations upon the facial configuration carried thereby.

19. The combination according to claim 16 in which at least ones of said plural companion masks have different surface skin tones and colors respectively representative of different human ethnic and racial origin.

20. The combination according to claim 16 in which said make-up mannequin head body comprises an outer hollow shell carrying said surface and a foamed-in filling, said body having a flat back surface and a base.

21. The combination according to claim 18 in which said back surface has an elevated portion integral therewith at an end portion thereof opposite from said base whereby upon disposition of said make-up mannequin head in a horizontal plane on said back surface upon a working surface, said make-up mannequin head assumes an attitude with the facial configuration thereof directed angularly upward simulative of the attitude assumed by the subject represented by said make-up mannequin head resting upon a raised body.

22. The combination according to claim 9 in which the outwardly facing surfaces of said make-up mannequin head and companion masks are simulative of the softness and resilience of human skin.

23. The combination according to claim 22 in which said surfaces have a porosity simulative of human skin.

24. The combination according to claim 22 in which said surfaces are non-porous and impervious to passage of cosmetic compositions.

\* \* \* \* \*